(12) United States Patent
Pechanek et al.

(10) Patent No.: US 7,197,624 B2
(45) Date of Patent: *Mar. 27, 2007

(54) MANIFOLD ARRAY PROCESSOR

(75) Inventors: Gerald George Pechanek, Cary, NC (US); Charles W. Kurak, Jr., Durham, NC (US)

(73) Assignee: Altera Corporation, San Jose, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 10/774,815

(22) Filed: Feb. 9, 2004

(65) Prior Publication Data

US 2004/0168040 A1    Aug. 26, 2004

Related U.S. Application Data

(60) Division of application No. 10/036,789, filed on Dec. 21, 2001, now Pat. No. 6,892,291, which is a continuation of application No. 09/323,609, filed on Jun. 1, 1999, now Pat. No. 6,338,129, which is a division of application No. 08/885,310, filed on Jun. 30, 1997, now Pat. No. 6,023,753.

(51) Int. Cl.
    *G06F 15/16* (2006.01)
(52) U.S. Cl. ........................... 712/11
(58) Field of Classification Search ............ 712/12, 712/11, 18
    See application file for complete search history.

(56) References Cited

U.S. PATENT DOCUMENTS 3,308,436 A * 3/1967 Borck, Jr. et al. ............ 712/10
4,270,170 A * 5/1981 Reddaway .................... 712/11
4,644,496 A * 2/1987 Andrews ...................... 712/13
5,574,939 A * 11/1996 Keckler et al. ............... 712/24
5,717,943 A * 2/1998 Barker et al. ................. 712/20

FOREIGN PATENT DOCUMENTS

EP         0569783        11/1993

OTHER PUBLICATIONS

Pechanek et al., M.F.A.S.T.: A Single Chip Highly Parallel Image Processing Architecture, Proceedings of the International Conference on Image Processing (ICIP), Oct. 23, 1995, pp. 69-72, vol. 3, Publisher: IEEE Comp. Soc. Press.

* cited by examiner

Primary Examiner—David Y. Eng
(74) Attorney, Agent, or Firm—Priest & Goldstein, PLLC

(57) ABSTRACT

An array processor includes processing elements (00, 01, 02, 03, 10, 11, 12, 13, 20, 21, 22, 23, 30, 31, 32, 33) arranged in clusters (e.g., 44, 46, 48, 50) to form a rectangular array (40). Inter-cluster communication paths (88) are mutually exclusive. Due to the mutual exclusivity of the data paths, communications between the processing elements of each cluster may be combined in a single inter-cluster path, thus eliminating half the wiring required for the path. The length of the longest communication path is not directly determined by the overall dimension of the array, as in conventional torus arrays. Rather, the longest communications path is limited by the inter-cluster spacing. Transpose elements of an N×N torus may be combined in clusters and communicate with one another through intra-cluster communications paths. Transpose operation latency is eliminated in this approach. Each PE may have a single transmit port (35) and a single receive port (37). Thus, the individual PEs are decoupled from the array topology.

15 Claims, 33 Drawing Sheets

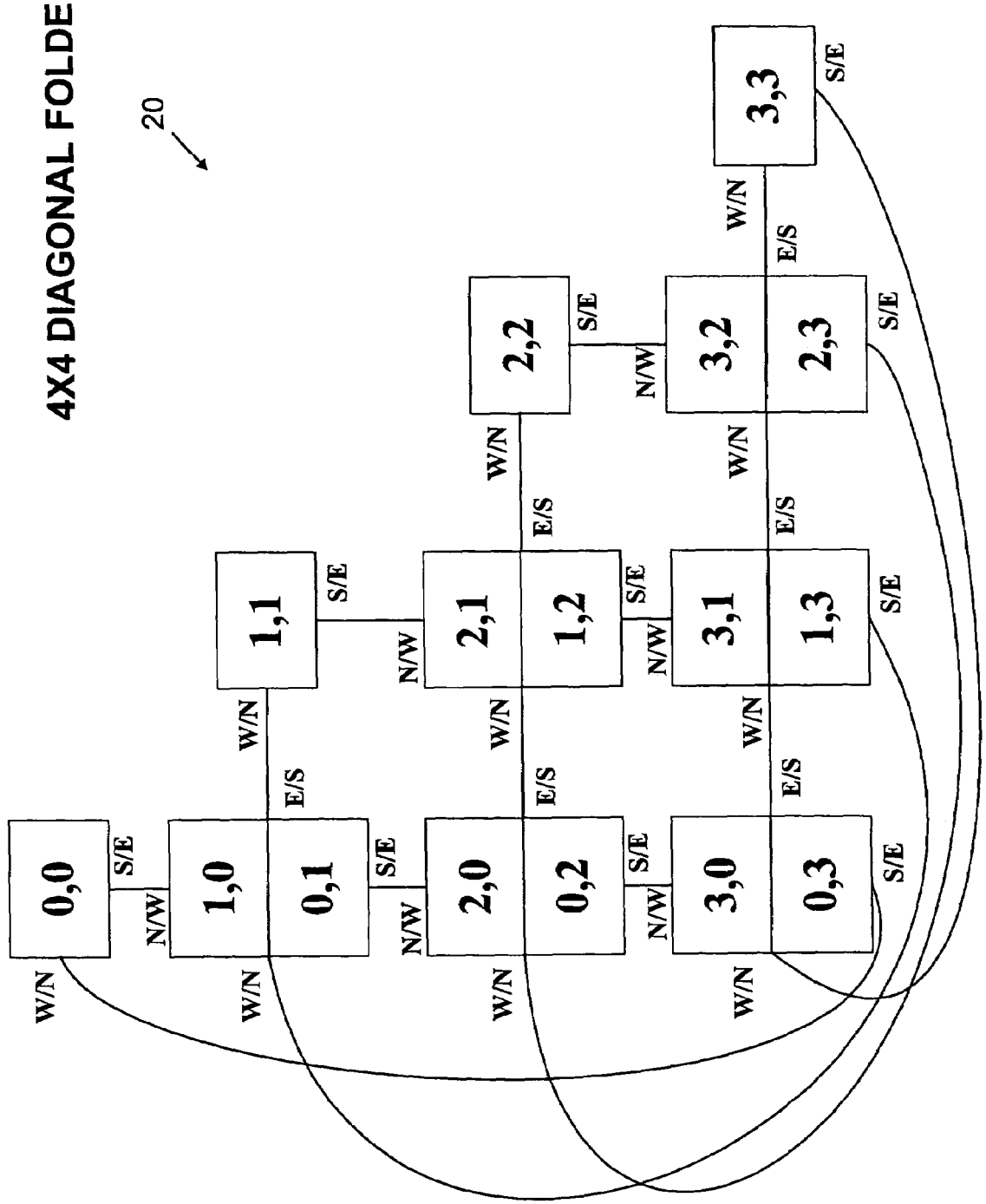

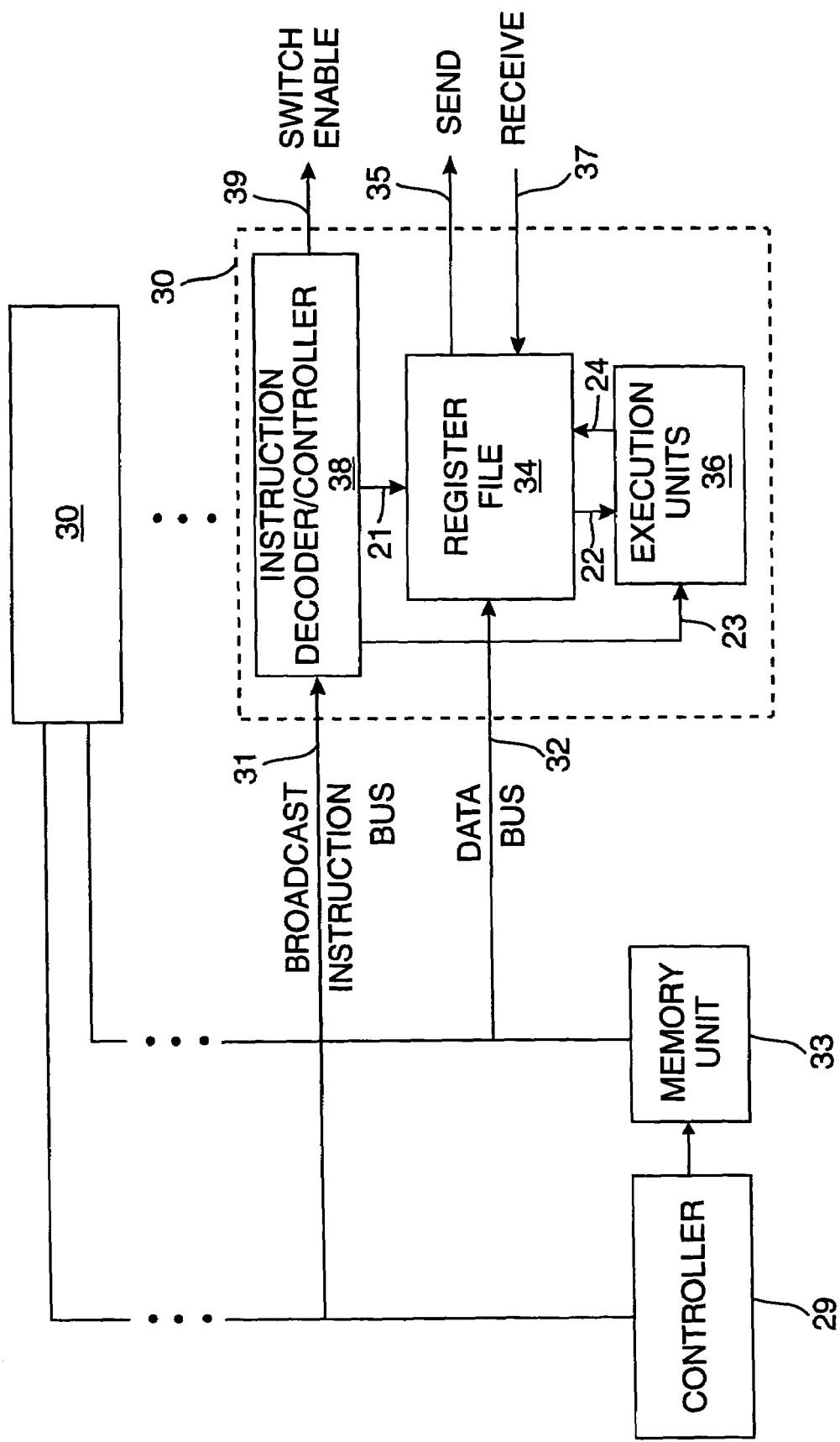

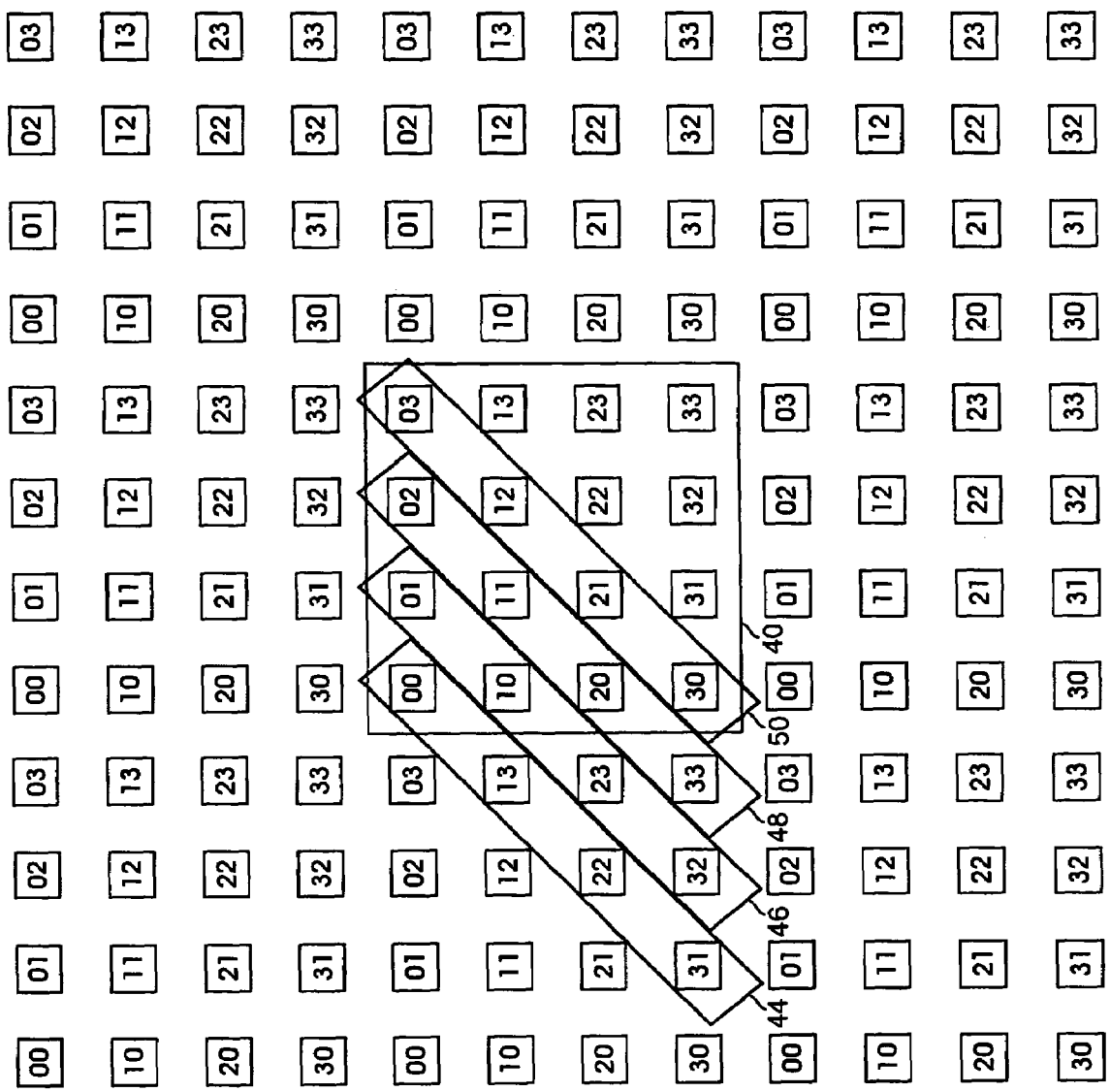

4x4 Rhombus

4x4 Rhombus

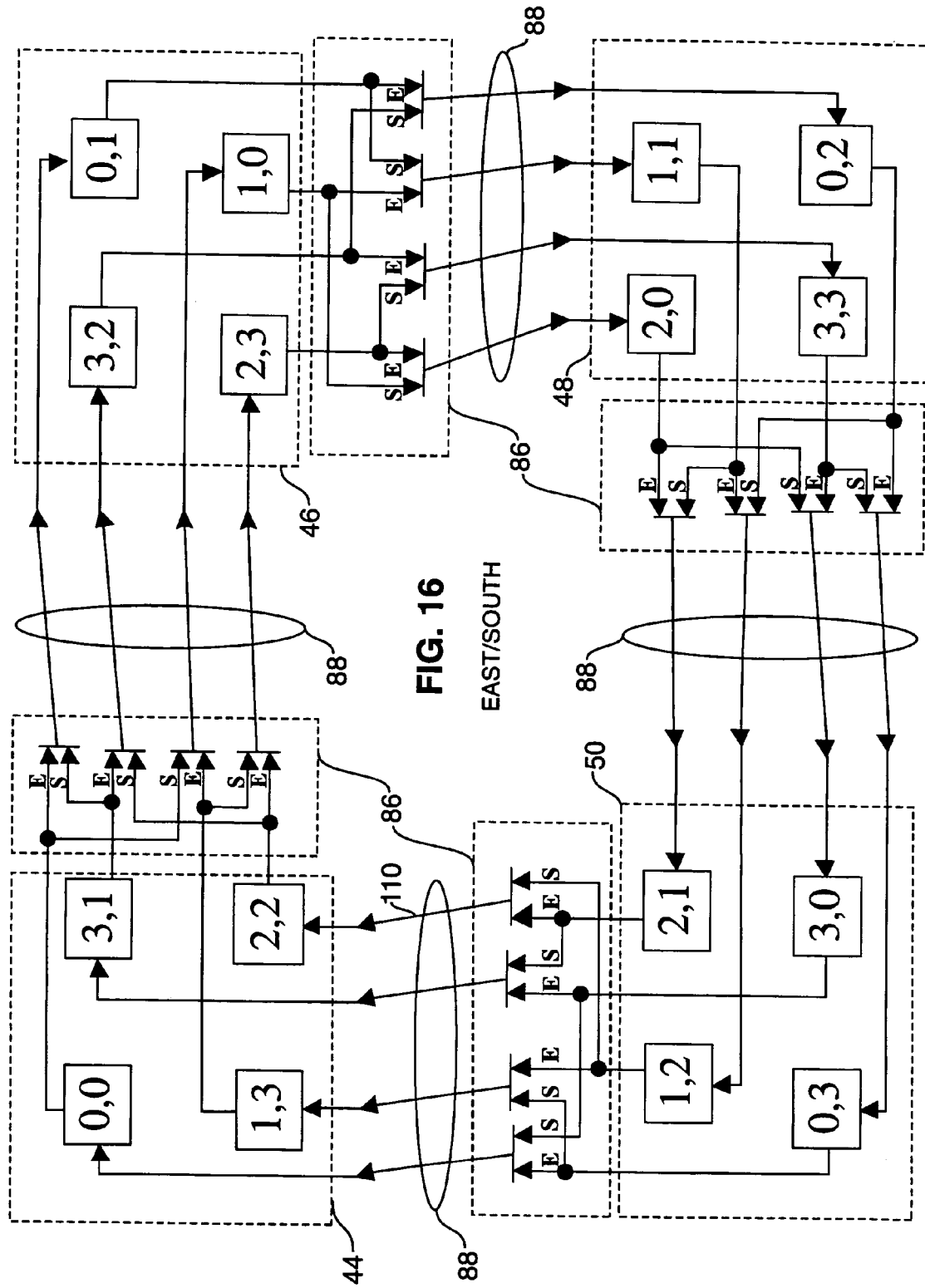

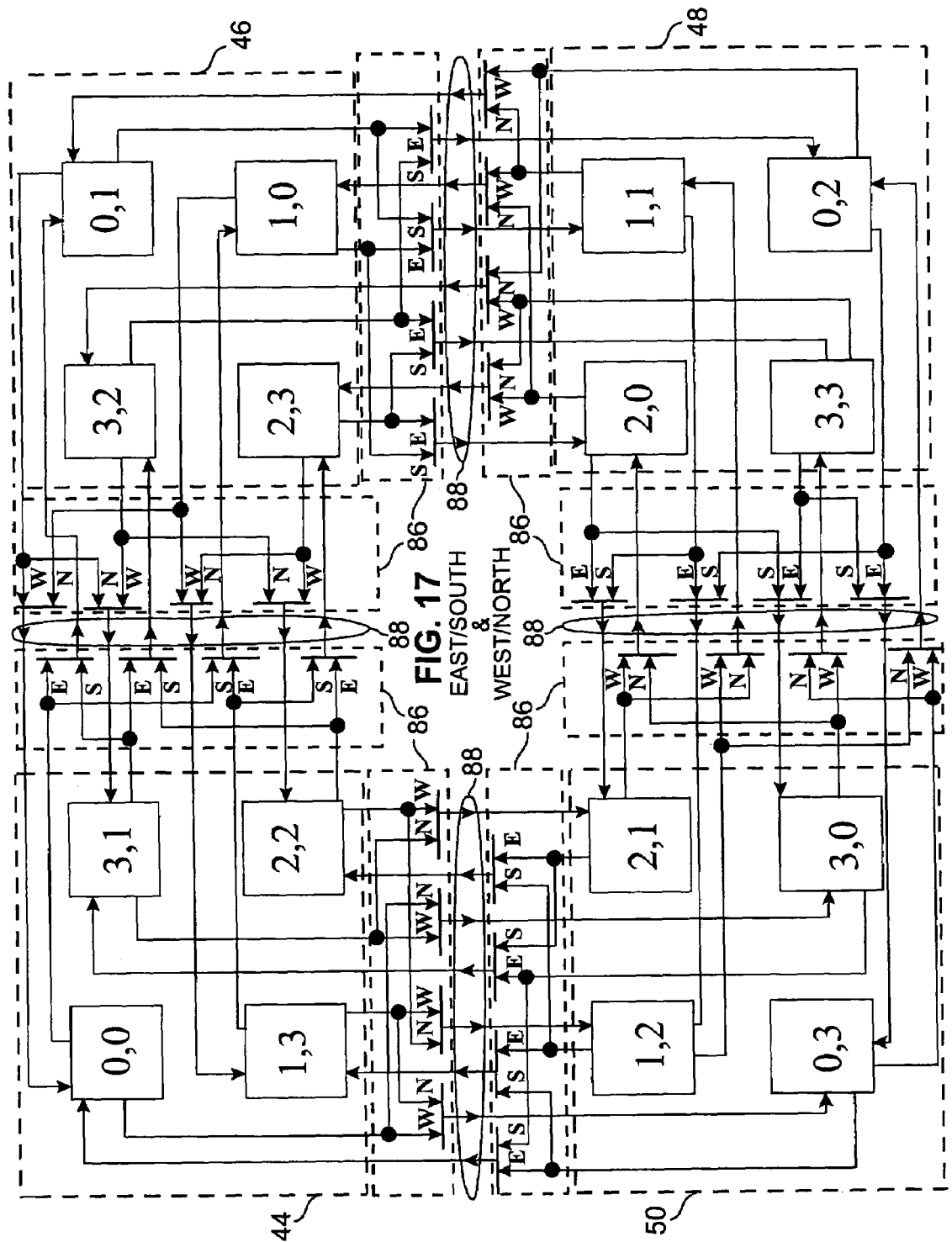

CONVOLUTION WINDOW

CONVOLUTION PATH FOR NODE i,j

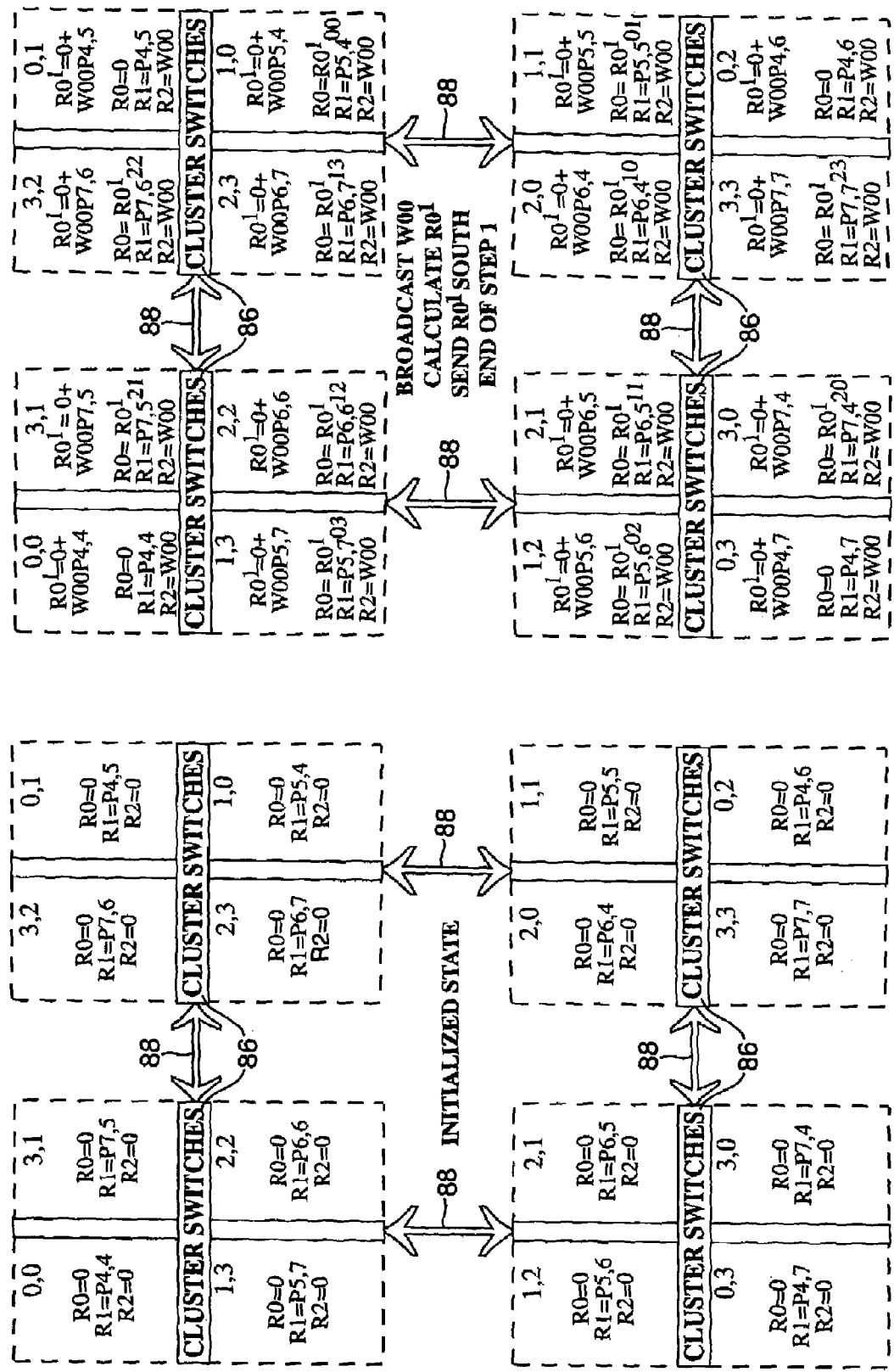

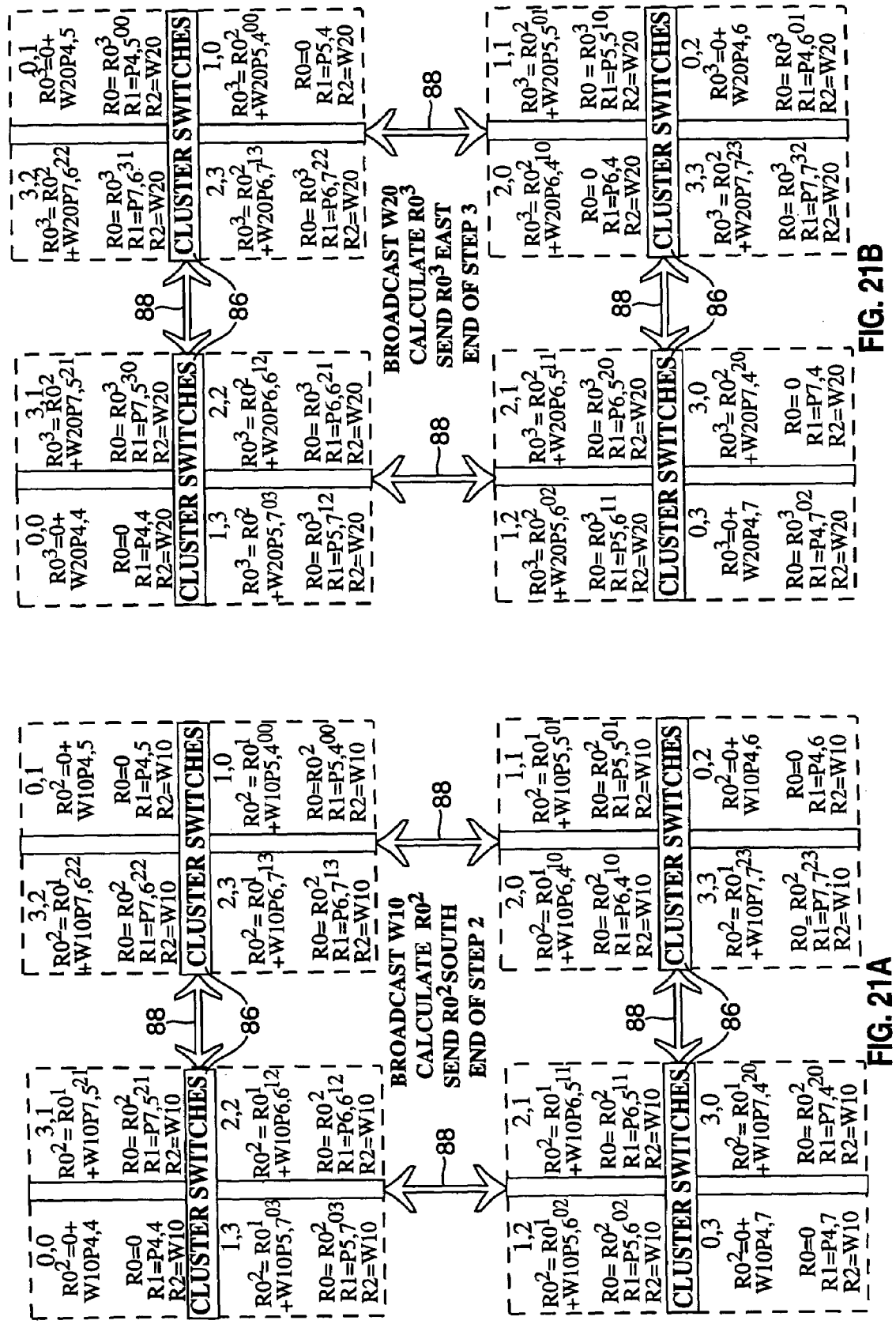

MANIFOLD ARRAY PROCESSOR

This application is a divisional of U.S. Ser. No. 10/036,789 filed Dec. 21, 2001 now U.S. Pat. No. 6,892,291 which is a continuation of U.S. Ser. No. 09/323,609 filed Jun. 1, 1999, now U.S. Pat. No. 6,338,129 which is a divisional of U.S. Ser. No. 08/885,310 filed Jun. 30, 1997, now U.S. Pat. No. 6,023,753 which are incorporated by reference herein in their entirety.

BACKGROUND OF THE INVENTION

1. Field of the Invention

The present invention relates to processing systems in general and, more specifically, to parallel processing architectures.

2. Description of the Related Art

Many computing tasks can be developed that operate in parallel on data. The efficiency of the parallel processor depends upon the parallel processor's architecture, the coded algorithms, and the placement of data in the parallel elements. For example, image processing, pattern recognition, and computer graphics are all applications which operate on data that is naturally arranged in two- or three-dimensional grids. The data may represent a wide variety of signals, such as audio, video, SONAR or RADAR signals, by way of example. Because operations such as discrete cosine transforms (DCT), inverse discrete cosine transforms (IDCT), convolutions, and the like which are commonly performed on such data may be performed upon different grid segments simultaneously, multiprocessor array systems have been developed which, by allowing more than one processor to work on the task at one time, may significantly accelerate such operations. Parallel processing is the subject of a large number patents including U.S. Pat. Nos. 5,065,339; 5,146,543; 5,146,420; 5,148,515; 5,546,336; 5,542,026; 5,612,908 and U.S. Pat. No. 5,577,262; European Published Application Nos. 0,726,529 and 0,726,532 which are hereby incorporated by reference.

One conventional approach to parallel processing architectures is the nearest neighbor mesh connected computer, which is discussed in R. Cypher and J. L. C. Sanz, *SIMD Architectures and Algorithms for Image Processing and Computer Vision*, IEEE Transactions on Acoustics, Speech and Signal Processing, Vol. 37, No. 12, pp. 2158–2174, December 1989; K. E. Batcher, *Design of a Massively Parallel Processor*, IEEE Transactions on Computers, Vol. C-29 No. 9, pp. 836–840 September 1980; and L. Uhr, *Multi-Computer Architectures for Artificial Intelligence*, New York, N.Y., John Wiley & Sons, Ch. 8, p. 97, 1987.

In the nearest neighbor torus connected computer of FIG. 1A multiple processing elements (PEs) are connected to their north, south, east and west neighbor PEs through torus connection paths MP and all PEs are operated in a synchronous single instruction multiple data (SIMD) fashion. Since a torus connected computer may be obtained by adding wraparound connections to a mesh-connected computer, a mesh-connected computer, one without wraparound connections, may be thought of as a subset of torus connected computers. As illustrated in FIG. 1B, each path MP may include T transmit wires and R receive wires, or as illustrated in FIG. 1C, each path MP may include B bidirectional wires. Although unidirectional and bidirectional communications are both contemplated by the invention, the total number of bus wires, excluding control signals, in a path will generally be referred to as k wires hereinafter, where k=B in a bidirectional bus design and k=T+R in a unidirectional bus design. It is assumed that a PE can transmit data to any of its neighboring PEs, but only one at a time. For example, each PE can transmit data to its east neighbor in one communication cycle. It is also assumed that a broadcast mechanism is present such that data and instructions can be dispatched from a controller simultaneously to all PEs in one broadcast dispatch period.

Although bit-serial inter-PE communications are typically employed to minimize wiring complexity, the wiring complexity of a torus-connected array nevertheless presents implementation problems. The conventional torus-connected array of FIG. 1A includes sixteen processing elements connected in a four by four array 10 of PEs. Each processing element $PE_{i,j}$ is labeled with its row and column number i and j, respectively. Each PE communicates to its nearest North (N), South (S), East (E) and West (W) neighbor with point to point connections. For example, the connection between $PE_{0,0}$ and $PE_{3,0}$ shown in FIG. 1A is a wraparound connection between $PE_{0,0}$'s N interface and $PE_{3,0}$'s south interface, representing one of the wraparound interfaces that forms the array into a torus configuration. In such a configuration, each row contains a set of N interconnections and, with N rows, there are $N^2$ horizontal connections. Similarly, with N columns having N vertical interconnections each, there are $N^2$ vertical interconnections. For the example of FIG. 1A, N=4. The total number of wires, such as the metallization lines in an integrated circuit implementation in an N×N torus-connected computer including wraparound connections, is therefore $2kN^2$, where k is the number of wires in each interconnection. The number k may be equal to one in a bit serial interconnection. For example with k=1 for the 4×4 array 10 as shown in FIG. 1A, $2kN^2=32$.

For a number of applications where N is relatively small, it is preferable that the entire PE array is incorporated in a single integrated circuit. The invention does not preclude implementations where each PE can be a separate microprocessor chip, for example. Since the total number of wires in a torus connected computer can be significant, the interconnections may consume a great deal of valuable integrated circuit "real estate", or the area of the chip taken up. Additionally, the PE interconnection paths quite frequently cross over one another complicating the IC layout process and possibly introducing noise to the communications lines through crosstalk. Furthermore, the length of wraparound links, which connect PEs at the North and South and at the East and West extremes of the array, increase with increasing array size. This increased length increases each communication line's capacitance, thereby reducing the line's maximum bit rate and introducing additional noise to the line.

Another disadvantage of the torus array arises in the context of transpose operations. Since a processing element and its transpose are separated by one or more intervening processing elements in the communications path, latency is introduced in operations which employ transposes. For example, should the $PE_{2,1}$ require data from its transpose, $PE_{1,2}$, the data must travel through the intervening $PE_{1,1}$ or $PE_{2,2}$. Naturally, this introduces a delay into the operation, even if $PE_{1,1}$ and $PE_{2,2}$ are not otherwise occupied. However, in the general case where the PEs are implemented as micro-processor elements, there is a very good probability that $PE_{1,1}$ and $PE_{2,2}$ will be performing other operations and, in order to transfer data or commands from $PE_{1,2}$ to $PE_{2,1}$, they will have to set aside these operations in an orderly fashion. Therefore, it may take several operations to even begin transferring the data or commands from $PE_{1,2}$ to $PE_{1,1}$ and the operations $PE_{1,1}$ was forced to set aside to transfer the transpose data will also be delayed. Such delays snowball with every intervening PE and significant latency is introduced for the most distant of the transpose pairs. For example the $PE_{3,1}/PE_{1,3}$ transpose pair of FIG. 1A, has a minimum of three intervening PEs, requiring a latency of four communication steps and could additionally incur the latency of all the tasks which must be set aside in all those PEs in order to transfer data between $PE_{3,1}$ and $PE_{1,3}$ in the general case.

Recognizing such limitations of torus connected arrays, new approaches to arrays have been disclosed in U.S. Pat. No. 5,612,908; *A Massively Parallel Diagonal Fold Array Processor*, G. G. Pechanek et al., 1993 International Conference on Application Specific Array Processors, pp. 140–143, Oct. 25–27, 1993, Venice, Italy, and *Multiple Fold Clustered Processor Torus Array*, G. G. Pechanek, et. al., Proceedings Fifth NASA Symposium on VLSI Design, pp. 8.4.1–11, Nov. 4–5, 1993, University of New Mexico, Albuquerque, N. Mex. which are incorporated by reference herein in their entirety. The operative technique of these torus array organizations is the folding of arrays of PEs using the diagonal PEs of the conventional nearest neighbor torus as the foldover edge. As illustrated in the array 20 of FIG. 2, these techniques may be employed to substantially reduce inter-PE wiring, to reduce the number and length of wraparound connections, and to position PEs in close proximity to their transpose PEs. This processor array architecture is disclosed, by way of example, in U.S. Pat. Nos. 5,577,262, 5,612,908, and EP 0,726,532 and EP 0,726,529 which were invented by the same inventor as the present invention and is incorporated herein by reference in its entirety. While such arrays provide substantial benefits over the conventional torus architecture, due to the irregularity of PE combinations, for example in a single fold diagonal fold mesh, some PEs are clustered "in twos", others are single, in a three fold diagonal fold mesh there are clusters of four PEs and eight PEs. Due to an overall triangular shape of the arrays, the diagonal fold type of array presents substantial obstacles to efficient, inexpensive integrated circuit implementation. Additionally, in a diagonal fold mesh as in EP 0,726,532 and EP 0,726,529, and other conventional mesh architectures, the interconnection topology is inherently part of the PE definition. This fixes the PE's position in the topology, consequently limiting the topology of the PEs and their connectivity to the fixed configuration that is implemented. Thus, a need exists for further improvements in processor array architecture and processor interconnection.

SUMMARY OF THE INVENTION

The present invention is directed to an array of processing elements which substantially reduce the array's interconnection wiring requirements when compared to the wiring requirements of conventional torus processing element arrays. In a preferred embodiment, one array in accordance with the present invention achieves a substantial reduction in the latency of transpose operations. Additionally, the inventive array decouples the length of wraparound wiring from the array's overall dimensions, thereby reducing the length of the longest interconnection wires. Also, for array communication patterns that cause no conflict between the communicating PEs, only one transmit port and one receive port are required per PE, independent of the number of neighborhood connections a particular topology may require of its PE nodes. A preferred integrated circuit implementation of the array includes a combination of similar processing element clusters combined to present a rectangular or square outline. The similarity of processing elements, the similarity of processing element clusters, and the regularity of the array's overall outline make the array particularly suitable for cost-effective integrated circuit manufacturing.

To form an array in accordance with the present invention, processing elements may first be combined into clusters which capitalize on the communications requirements of single instruction multiple data ("SIMD") operations. Processing elements may then be grouped so that the elements of one cluster communicate within a cluster and with members of only two other clusters. Furthermore, each cluster's constituent processing elements communicate in only two mutually exclusive directions with the processing elements of each of the other clusters. By definition, in a SIMD torus with unidirectional communication capability, the North/South directions are mutually exclusive with the East/West directions. Processing element clusters are, as the name implies, groups of processors formed preferably in close physical proximity to one another. In an integrated circuit implementation, for example, the processing elements of a cluster preferably would be laid out as close to one another as possible, and preferably closer to one another than to any other processing element in the array. For example, an array corresponding to a conventional four by four torus array of processing elements may include four clusters of four elements each, with each cluster communicating only to the North and East with one other cluster and to the South and West with another cluster, or to the South and East with one other cluster and to the North and West with another cluster. By clustering PEs in this manner, communications paths between PE clusters may be shared, through multiplexing, thus substantially reducing the interconnection wiring required for the array.

In a preferred embodiment, the PEs comprising a cluster are chosen so that processing elements and their transposes are located in the same cluster and communicate with one another through intra-cluster communications paths, thereby eliminating the latency associated with transpose operations carried out on conventional torus arrays. Additionally, since the conventional wraparound path is treated the same as any PE-to-PE path, the longest communications path may be as short as the inter-cluster spacing, regardless of the array's overall dimension. According to the invention an N×M torus may be transformed into an array of M clusters of N PEs, or into N clusters of M PEs.

These and other features, aspects and advantages of the invention will be apparent to those skilled in the art from the following detailed description, taken together with the accompanying drawings.

BRIEF DESCRIPTION OF THE DRAWINGS

FIG. 2 is a block diagram of a prior art diagonal folded mesh;

FIG. 3A is a block diagram of a processing element which may suitably be employed within the PE array of the present invention;

FIGS. 5A through 5G are tilings of a 4×4 torus which illustrate the selection of PEs for cluster groupings in accordance with the present invention;

FIG. 7 is a tiling of a 3×3 torus which illustrates the selection of PEs for PE clusters;

FIG. 8 is a tiling of a 3×5 torus which illustrates the selection of PEs for PE clusters;

FIG. 16 is a block diagram illustrating East/South communications paths within an array of four four-member clusters;

FIG. 17 is a block diagram illustration of East/South and West/North communications paths within an array of four four-member clusters;

FIGS. 20A through 24B are block diagrams which illustrate the state of a manifold array in accordance with the present invention at the end of each convolution operational step.

DETAILED DESCRIPTION

Figure 1A:
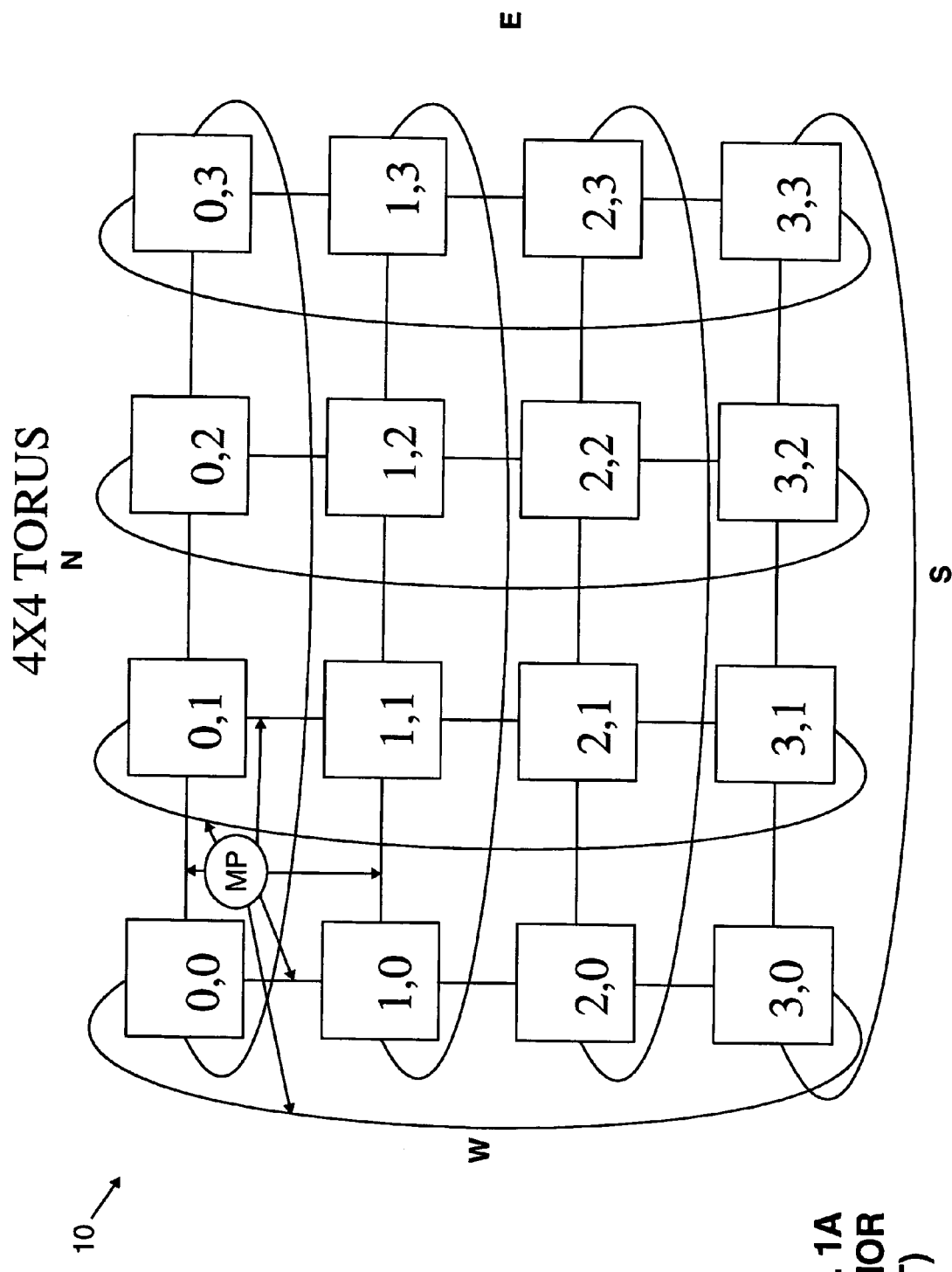
FIG. 1A is a block diagram of a conventional prior art 4×4 nearest neighbor connected torus processing element (PE) array.
Figure 1C:
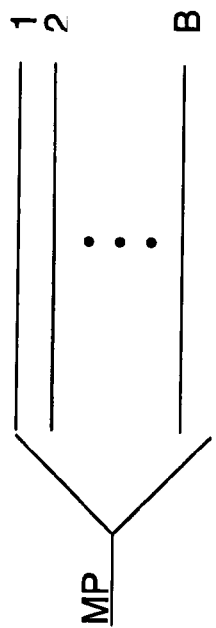
FIG. 1C illustrates how prior art torus connection paths of FIG. 1A may include B bidirectional wires.
Figure 1B:
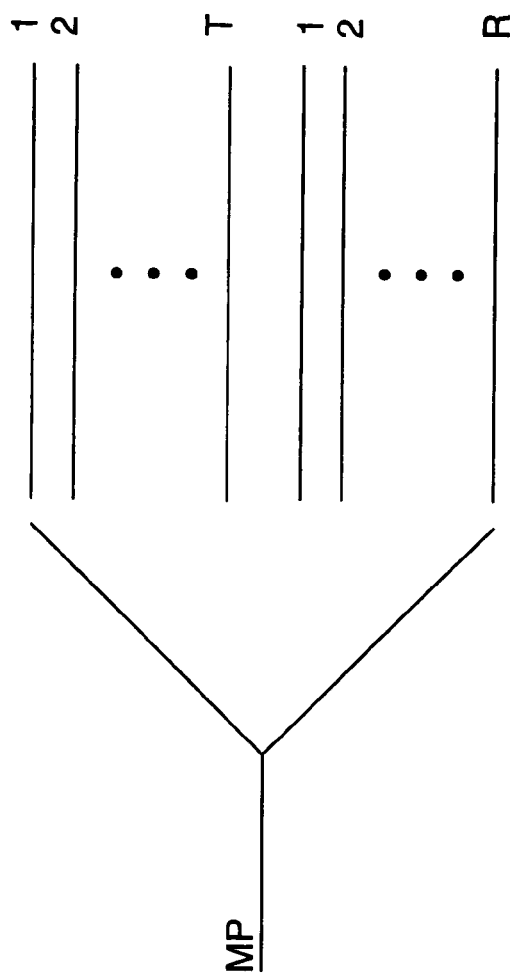
FIG. 1B illustrates how the prior art torus connection paths of FIG. 1A may include T transmit and R receive wires.

In one embodiment, a new array processor in accordance with the present invention combines PEs in clusters, or groups, such that the elements of one cluster communicate with members of only two other clusters and each cluster's constituent processing elements communicate in only two mutually exclusive directions with the processing elements of each of the other clusters. By clustering PEs in this manner, communications paths between PE clusters may be shared, thus substantially reducing the interconnection wiring required for the array. Additionally, each PE may have a single transmit port and a single receive port or, in the case of a bidirectional sequential or time sliced transmit/receive communication implementation, a single transmit/receive port. As a result, the individual PEs are decoupled from the topology of the array. That is, unlike a conventional torus connected array where each PE has four bidirectional communication ports, one for communication in each direction, PEs employed by the new array architecture need only have one port. In implementations which utilize a single transmit and a single receive port, all PEs in the array may simultaneously transmit and receive. In the conventional torus, this would require four transmit and four receive ports, a total of eight ports, per PE, while in the present invention, one transmit port and one receive port, a total of two ports, per PE are required.

In one presently preferred embodiment, the PEs comprising a cluster are chosen so that processing elements and their transposes are located in the same cluster and communicate with one another through intra-cluster communications paths. For convenience of description, processing elements are referred to as they would appear in a conventional torus array, for example, processing element $PE_{0,0}$ is the processing element that would appear in the "Northwest" corner of a conventional torus array. Consequently, although the layout of the new cluster array is substantially different from that of a conventional array processor, the same data would be supplied to corresponding processing elements of the conventional torus and new cluster arrays. For example, the $PE_{0,0}$ element of the new cluster array would receive the same data to operate on as the $PE_{0,0}$ element of a conventional torus-connected array. Additionally, the directions referred to in this description will be in reference to the directions of a torus-connected array. For example, when communications between processing elements are said to take place from North to South, those directions refer to the direction of communication within a conventional torus-connected array.

The PEs may be single microprocessor chips that may be of a simple structure tailored for a specific application. Though not limited to the following description, a basic PE will be described to demonstrate the concepts involved. The basic structure of a PE 30 illustrating one suitable embodiment which may be utilized for each PE of the new PE array of the present invention is illustrated in FIG. 3A. For simplicity of illustration, interface logic and buffers are not shown. A broadcast instruction bus 31 is connected to receive dispatched instructions from a SIMD controller 29, and a data bus 32 is connected to receive data from memory 33 or another data source external to the PE 30. A register file storage medium 34 provides source operand data to execution units 36. An instruction decoder/controller 38 is connected to receive instructions through the broadcast instruction bus 31 and to provide control signals 21 to registers within the register file 34 which, in turn, provide their contents as operands via path 22 to the execution units 36. The execution units 36 receive control signals 23 from the instruction decoder/controller 38 and provide results via path 24 to the register file 34. The instruction decoder/controller 38 also provides cluster switch enable signals on an output the line 39 labeled Switch Enable. The function of cluster switches will be discussed in greater detail below in conjunction with the discussion of FIG. 18. Inter-PE communications of data or commands are received at receive input 37 labeled Receive and are transmitted from a transmit output 35 labeled Send.

Figure 3B:
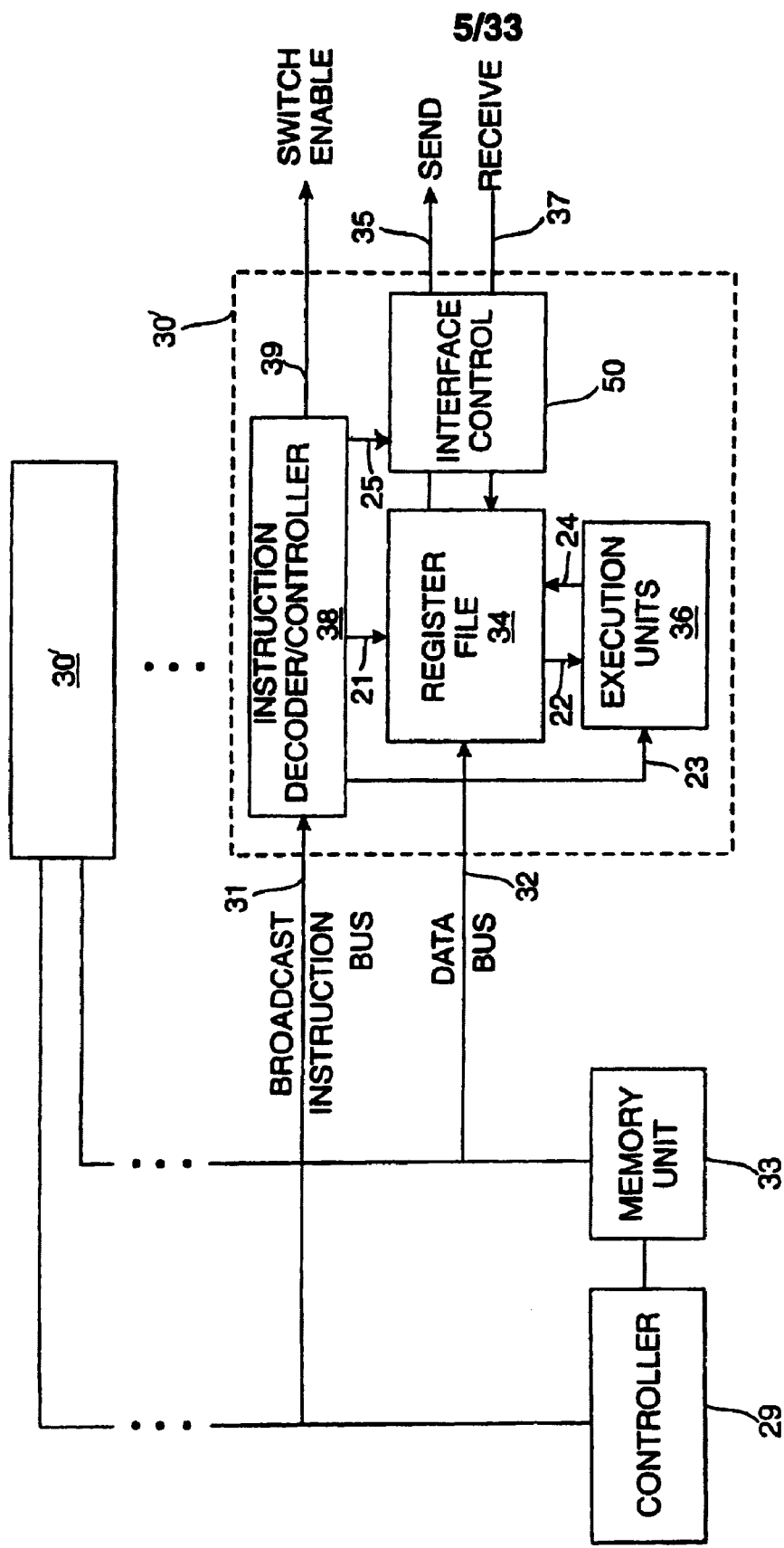
FIG. 3B is a block diagram of an alternative processing element which may suitably be employed within the PE array of the present invention.

FIG. 3B shows an alternative PE representation 30' that includes an interface control unit 50 which provides data formatting operations based upon control signals 25 received from the instruction decoder/controller 38. Data formatting operations can include, for example, parallel to serial and serial to parallel conversions, data encryption, and data format conversions to meet various standards or interface requirements.

Figure 4:
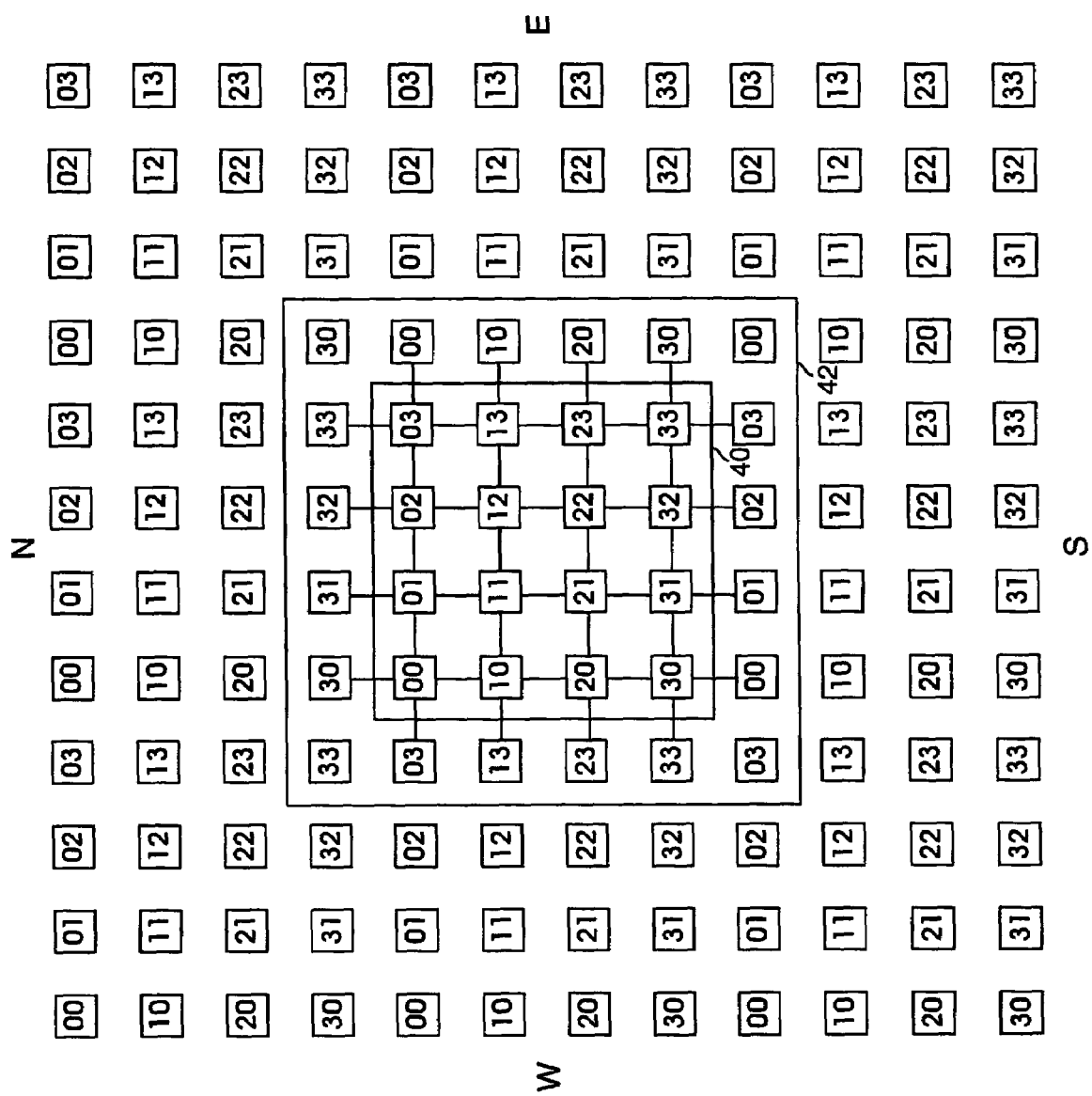
FIG. 4 is a tiling of a 4×4 torus which illustrates all the torus's inter-PE communications links.

A conventional 4×4 nearest neighbor torus of PEs of the same type as the PE 30 illustrated in FIG. 3A is shown surrounded by tilings of itself in FIG. 4. The center 4×4 torus 40 is encased by a ring 42 which includes the wraparound connections of the torus. The tiling of FIG. 4 is a descriptive aid used to "flatten out" the wraparound connections and to thereby aid in explanation of the preferred cluster forming process utilized in the array of one embodiment of the present invention. For example, the wraparound connection to the west from $PE_{0,0}$ is $PE_{0,3}$, that from the $PE_{1,3}$ to the east is $PE_{1,0}$, etc., as illustrated within the block 42. The utility of this view will be more apparent in relation to the discussion below of FIGS. 5A–5G.

In FIG. 5A, the basic 4×4 PE torus is once again surrounded by tilings of itself. The present invention recognizes that communications to the East and South from $PE_{0,0}$ involve $PE_{0,1}$ and $PE_{1,0}$, respectively. Furthermore, the PE which communicates to the east to $PE_{1,0}$ is $PE_{1,3}$ and $PE_{1,3}$ communicates to the South to $PE_{2,3}$. Therefore, combining the four PEs, $PE_{0,0}$, $PE_{1,3}$, $PE_{2,2}$, and $PE_{3,3}$ in one cluster yields a cluster 44 from which PEs communicate only to the South and East with another cluster 46 which includes PEs, $PE_{0,1}$, $PE_{1,0}$, $PE_{2,3}$, and $PE_{3,2}$. Similarly, the PEs of cluster 46 communicate to the South and East with the PEs of cluster 48 which includes PEs, $PE_{0,2}$, $PE_{1,1}$, $PE_{2,0}$, and $PE_{3,3}$. The PEs, $PE_{0,3}$, $PE_{1,2}$, $PE_{2,1}$, and $PE_{3,0}$ of cluster 50 communicate to the South and East with cluster 44. This combination yields clusters of PEs which communicate with PEs in only two other clusters and which communicate in mutually exclusive directions to those clusters. That is, for example, the PEs of cluster 48 communicate only to the South and East with the PEs of cluster 50 and only to the North and West with the PEs of cluster 46. It is this exemplary of grouping of PEs which permits the inter-PE connections within an array in accordance with the present invention to be substantially reduced in comparison with the requirements of the conventional nearest neighbor torus array.

Figure 5B:
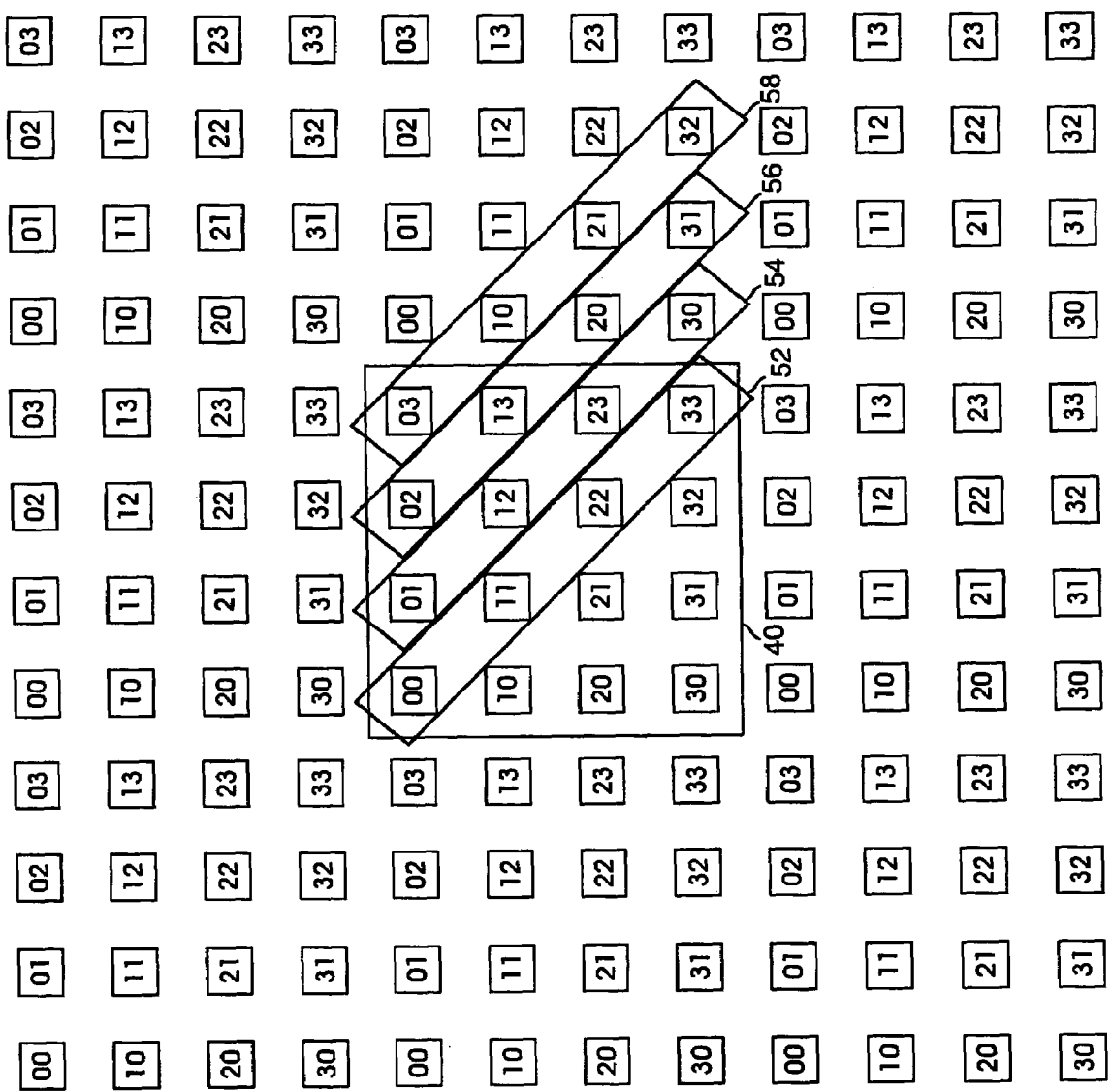
Figure 5C:
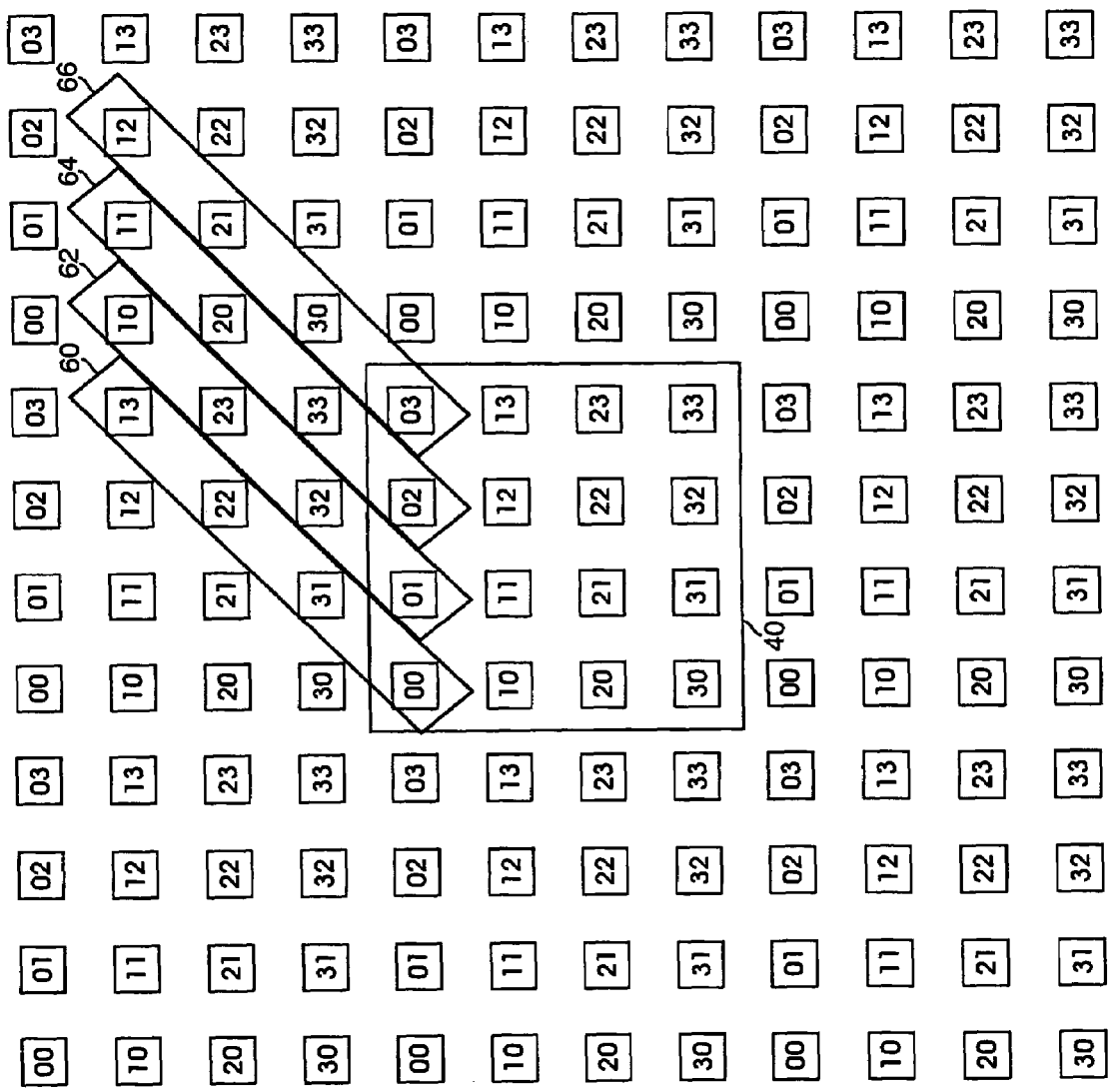
Figure 5D:
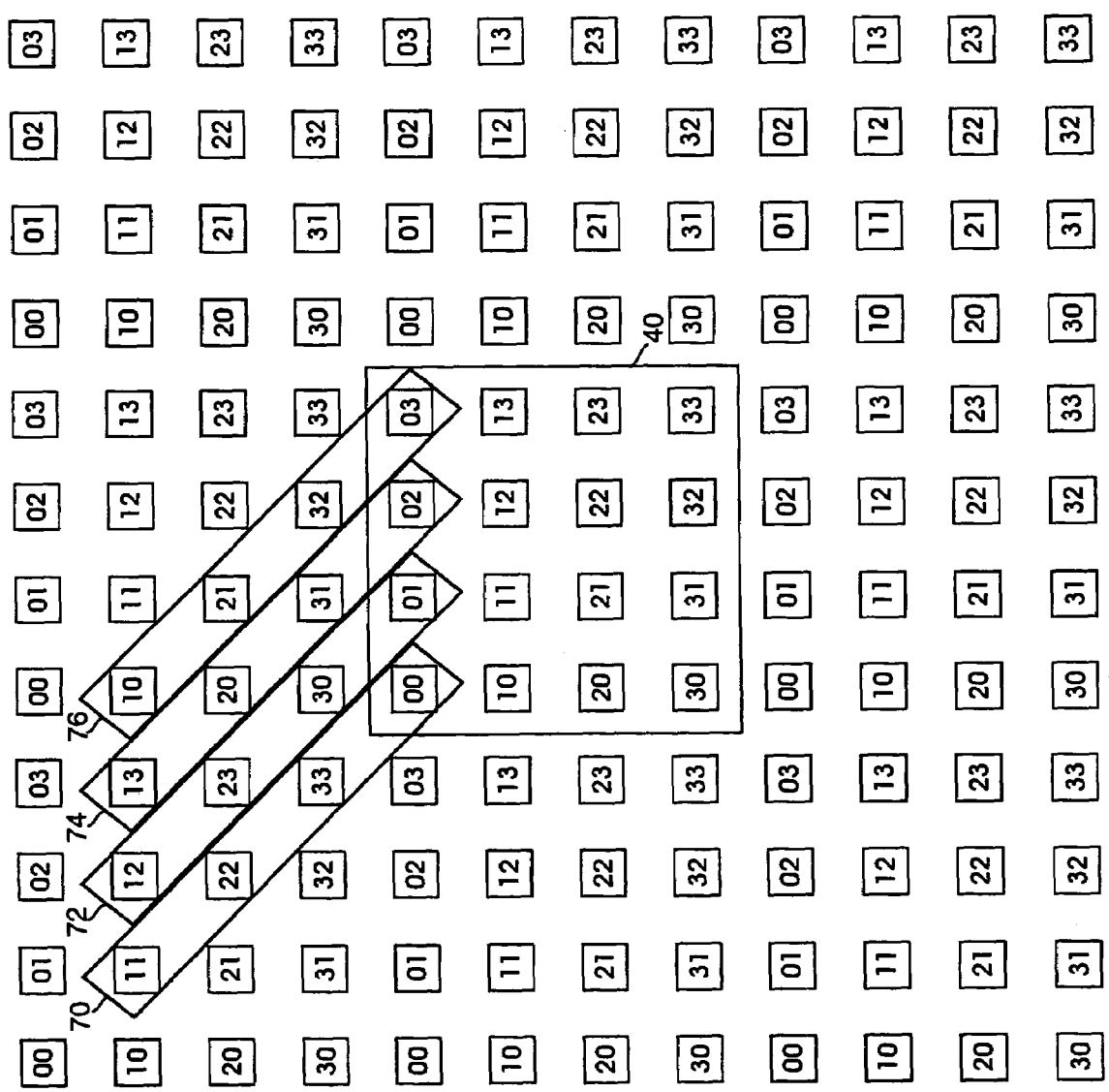
Figure 5E:
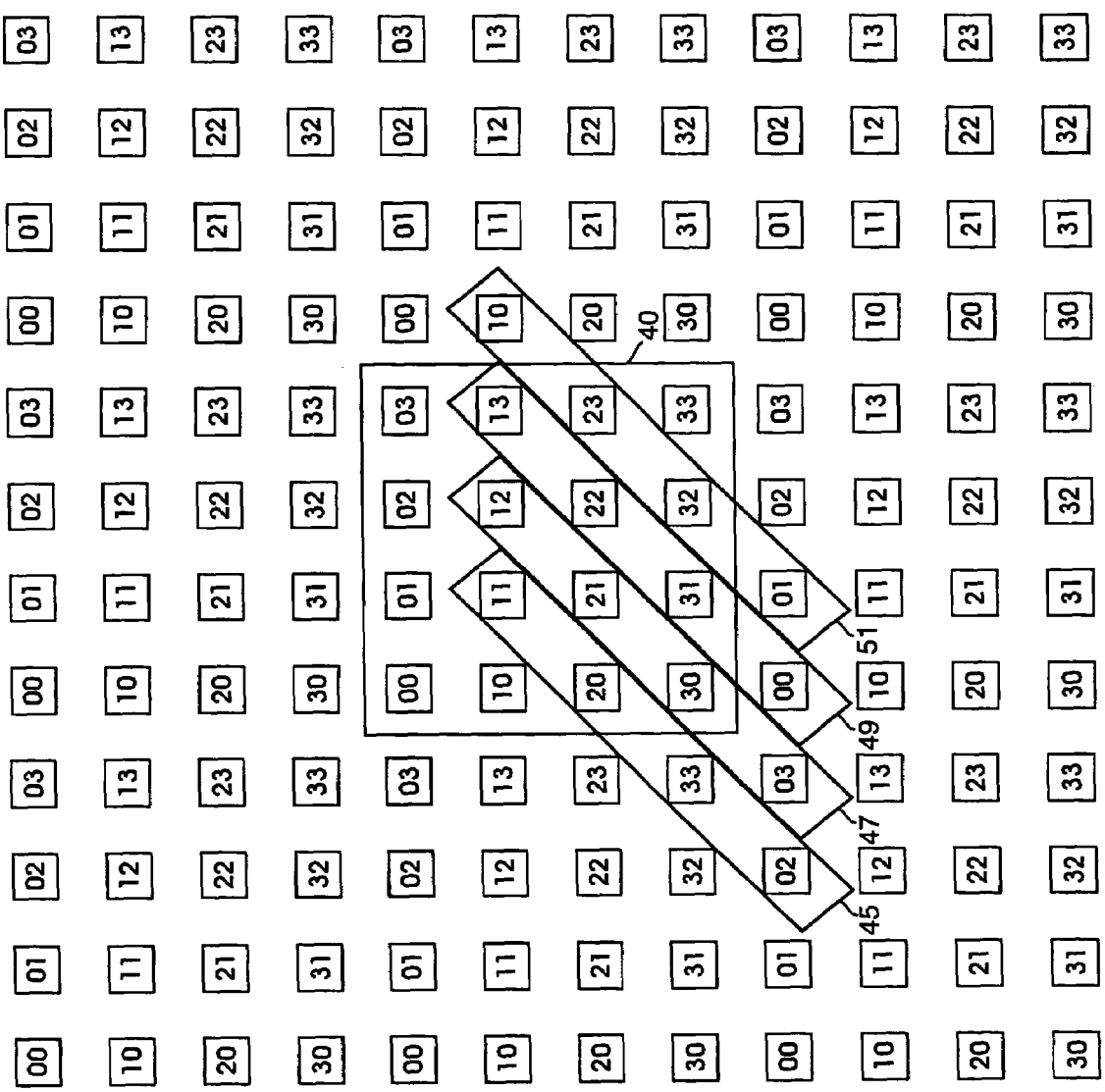

Many other combinations are possible. For example, starting again with $PE_{0,0}$ and grouping PEs in relation to communications to the North and East yields clusters 52, 54, 56 and 58 of FIG. 5B. These clusters may be combined in a way which greatly reduces the interconnection requirements of the PE array and which reduces the length of the longest inter-PE connection. However, these clusters do not combine PEs and their transposes as the clusters 44–50 in FIG. 5A do. That is, although transpose pairs $PE_{0,2}/PE_{2,0}$ and $PE_{1,3}/PE_{3,1}$ are contained in cluster 56, the transpose pair $PE_{0,1}/PE_{1,0}$ is split between clusters 54 and 58. An array in accordance with the presently preferred embodiment employs only clusters such as 44–50 which combine all PEs with their transposes within clusters. For example, in FIG. 5A the $PE_{3,1}/PE_{1,3}$ transpose pair is contained within cluster 44, the $PE_{3,2}$, $PE_{2,3}$ and $PE_{1,0}/PE_{0,1}$ transpose pairs are contained within cluster 46, the $PE_{0,2}/PE_{2,0}$ transpose pair is contained within cluster 48, and the $PE_{3,0}/PE_{0,3}$ and $PE_{2,1}/PE_{1,2}$ transpose pairs are contained within cluster 50. Clusters 60, 62, 64 and 68 of FIG. 5C are formed, starting at $PE_{0,0}$, by combining PEs which communicate to the North and West. Note that cluster 60 is equivalent to cluster 44, cluster 62 is equivalent to cluster 46, cluster 64 is equivalent to cluster 48 and cluster 68 is equivalent to cluster 50. Similarly, clusters 70 through 76 of FIG. 5D, formed by combining PEs which communicate to the South and West, are equivalent to clusters 52 through 58, respectively of FIG. 5B. As demonstrated in FIG. 5E, clusters 45, 47, 49 and 51, which are equivalent to the preferred clusters 48, 50, 44 and 46 may be obtained from any "starting point" within the torus 40 by combining PEs which communicate to the South and East.

Figure 5F:
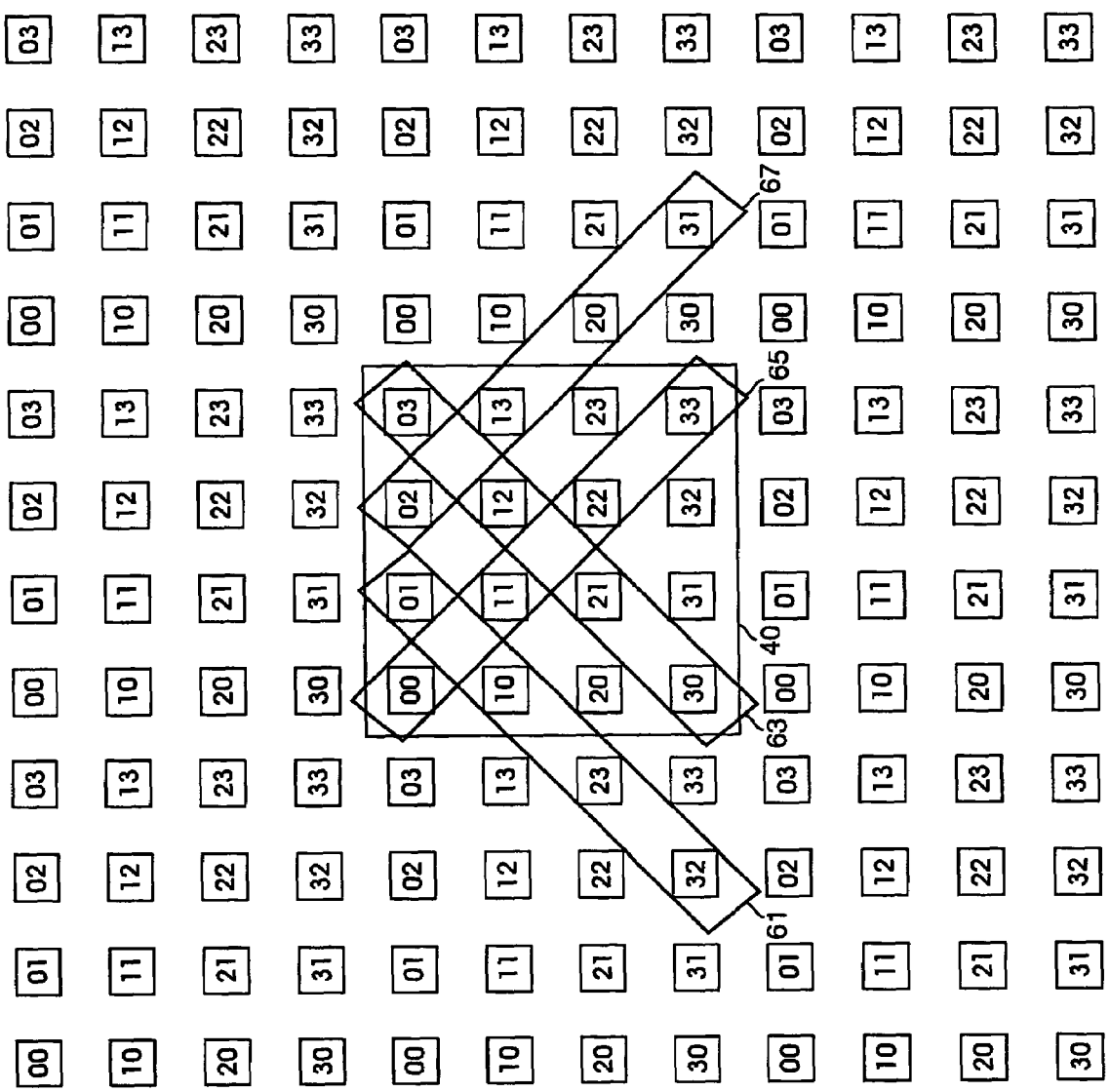

Another clustering is depicted in FIG. 5F where clusters 61, 63, 65, and 67 form a criss cross pattern in the tilings of the torus 40. This clustering demonstrates that there are a number of ways in which to group PEs to yield clusters which communicate with two other clusters in mutually exclusive directions. That is, $PE_{0,0}$ and $PE_{2,2}$ of cluster 65 communicate to the East with $PE_{0,1}$ and $PE_{2,3}$, respectively, of cluster 61. Additionally, $PE_{1,1}$ and $PE_{3,3}$ of cluster 65 communicate to the West with $PE_{1,0}$ and $PE_{3,2}$ respectively, of cluster 61. As will be described in greater detail below, the Easterly communications paths just described, that is, those between $PE_{0,0}$ and $PE_{0,1}$ and between $PE_{2,2}$ and $PE_{2,3}$, and other inter-cluster paths may be combined with mutually exclusive inter-cluster communications paths, through multiplexing for example, to reduce by half the number of interconnection wires required for inter-PE communications. The clustering of FIG. 5F also groups transpose elements within clusters.

Figure 5G:
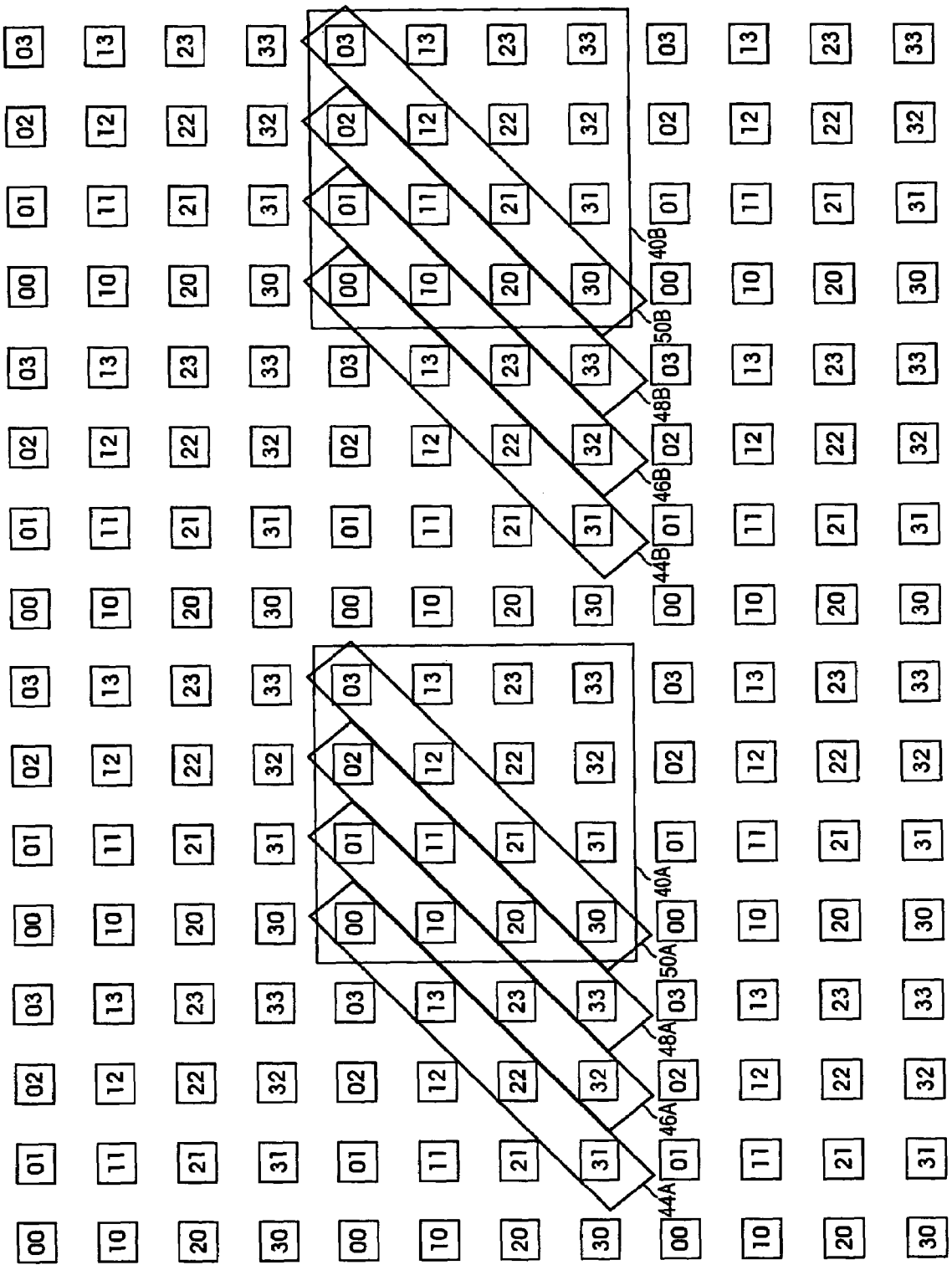

One aspect of the new array's scalability is demonstrated by FIG. 5G, where a 4×8 torus array is depicted as two 4×4 arrays 40A and 40B. One could use the techniques described to this point to produce eight four-PE clusters from a 4×8 torus array. In addition, by dividing the 4×8 torus into two 4×4 toruses and combining respective clusters into clusters, that is clusters 44A and 44B, 46A and 46B, and so on, for example, four eight-PE clusters with all the connectivity and transpose relationships of the 4×4 subclusters contained in the eight four-PE cluster configuration is obtained. This cluster combining approach is general and other scalings are possible.

The presently preferred, but not sole, clustering process may also be described as follows. Given an N×N basic torus $PE_{i,j}$, where i=0,1,2, . . . N−1 and j=0, 1, 2, . . . N−1, the preferred, South- and East-communicating clusters may be formed by grouping $PE_{i,j}$, $PE_{(i+1)(ModN), (j+N-1)(ModN)}$, $PE_{(i+2)(ModN), (j+N-2)(Modn)}$, . . . , $PE_{(i+N-1)(ModN), (j+N-(N-1))(ModN)}$. This formula can be rewritten for an N×N torus array with N clusters of N PEs in which the cluster groupings can be formed by selecting an i and a j, and then using the formula: $PE_{(i+a)(ModN), (j+N-a)(ModN)}$ for any i,j and for all a ∈ {0,1, . . . , N−1}.

Figure 6:
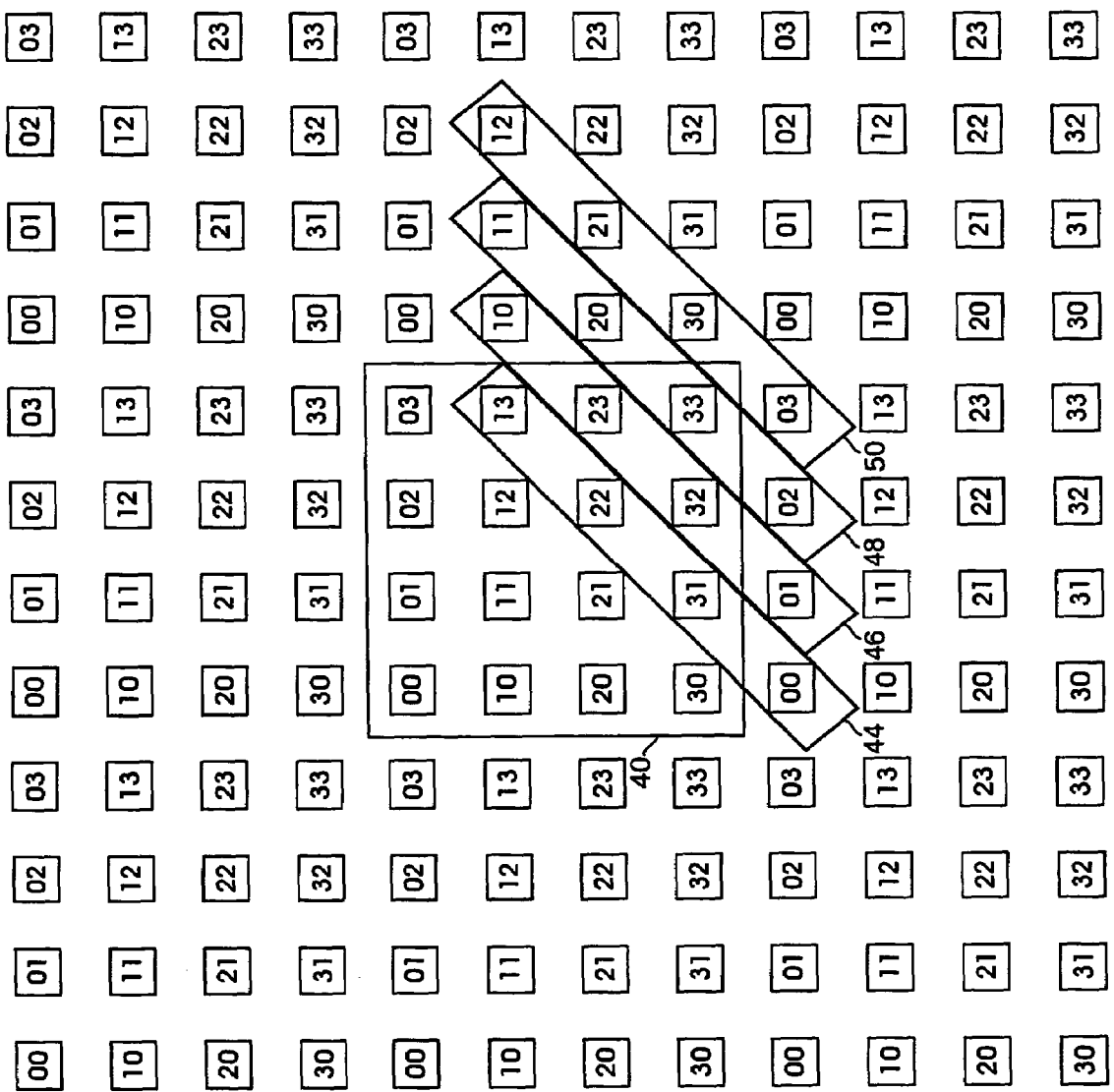
FIG. 6 is a tiling of a 4×4 torus which illustrates alternative grouping of PEs for clusters.
Figure 7:
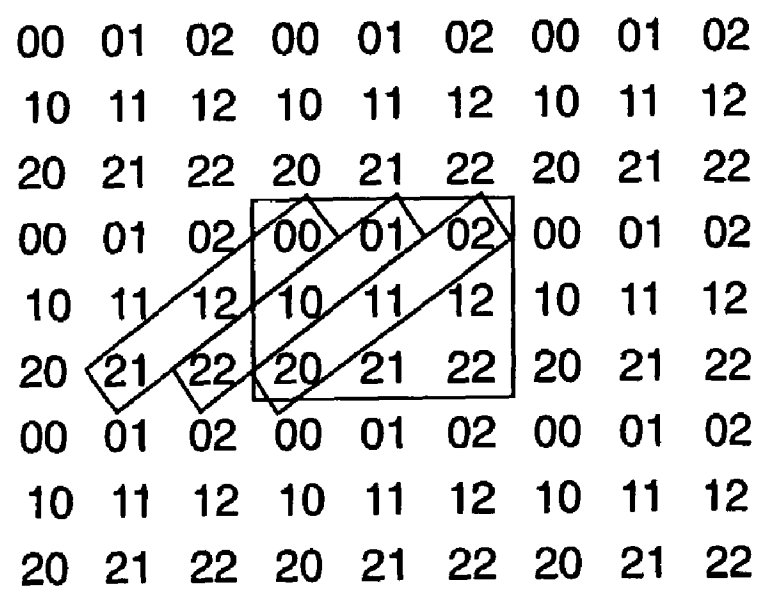
Figure 8:
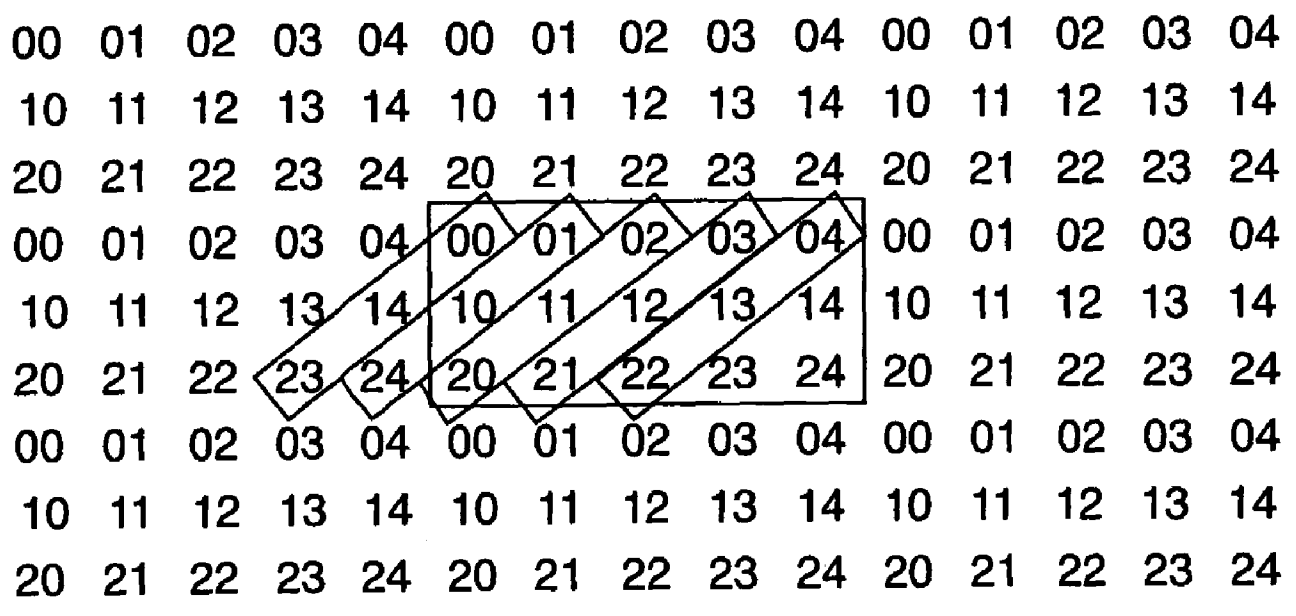

FIG. 6 illustrates the production of clusters 44 through 50 beginning with $PE_{1,3}$ and combining PEs which communicate to the South and East. In fact, the clusters 44 through 50, which are the clusters of the preferred embodiment of a 4×4 torus equivalent of the new array, are obtained by combining South and East communicating PEs, regardless of what PE within the basic N×N torus 40 is used as a starting point. FIGS. 7 and 8 illustrate additional examples of the approach, using 3×3 and 3×5 toruses, respectively.

Figure 9:
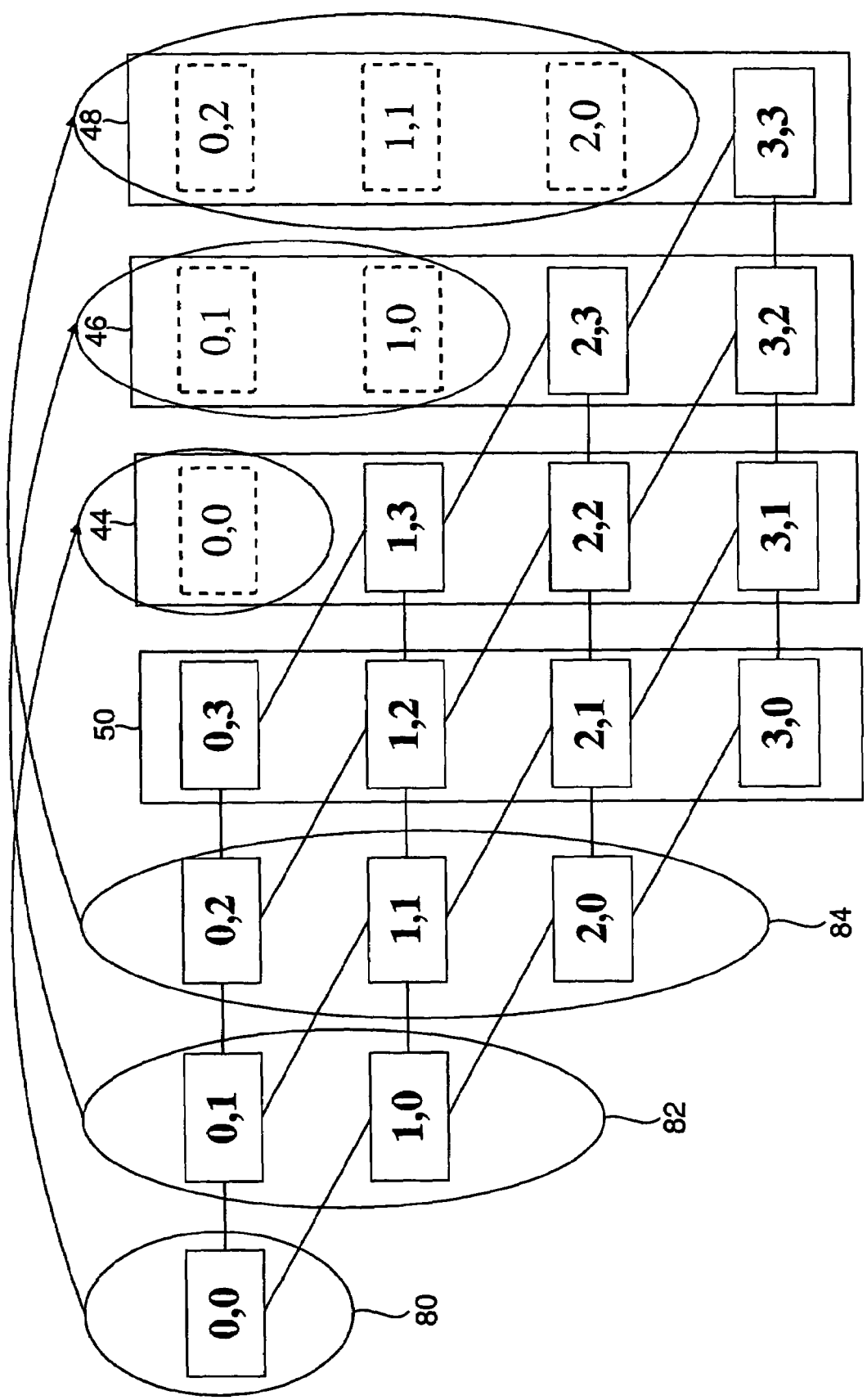
FIG. 9 is a block diagram illustrating an alternative, rhombus/cylinder approach to selecting PEs for PE clusters.
Figure 10:
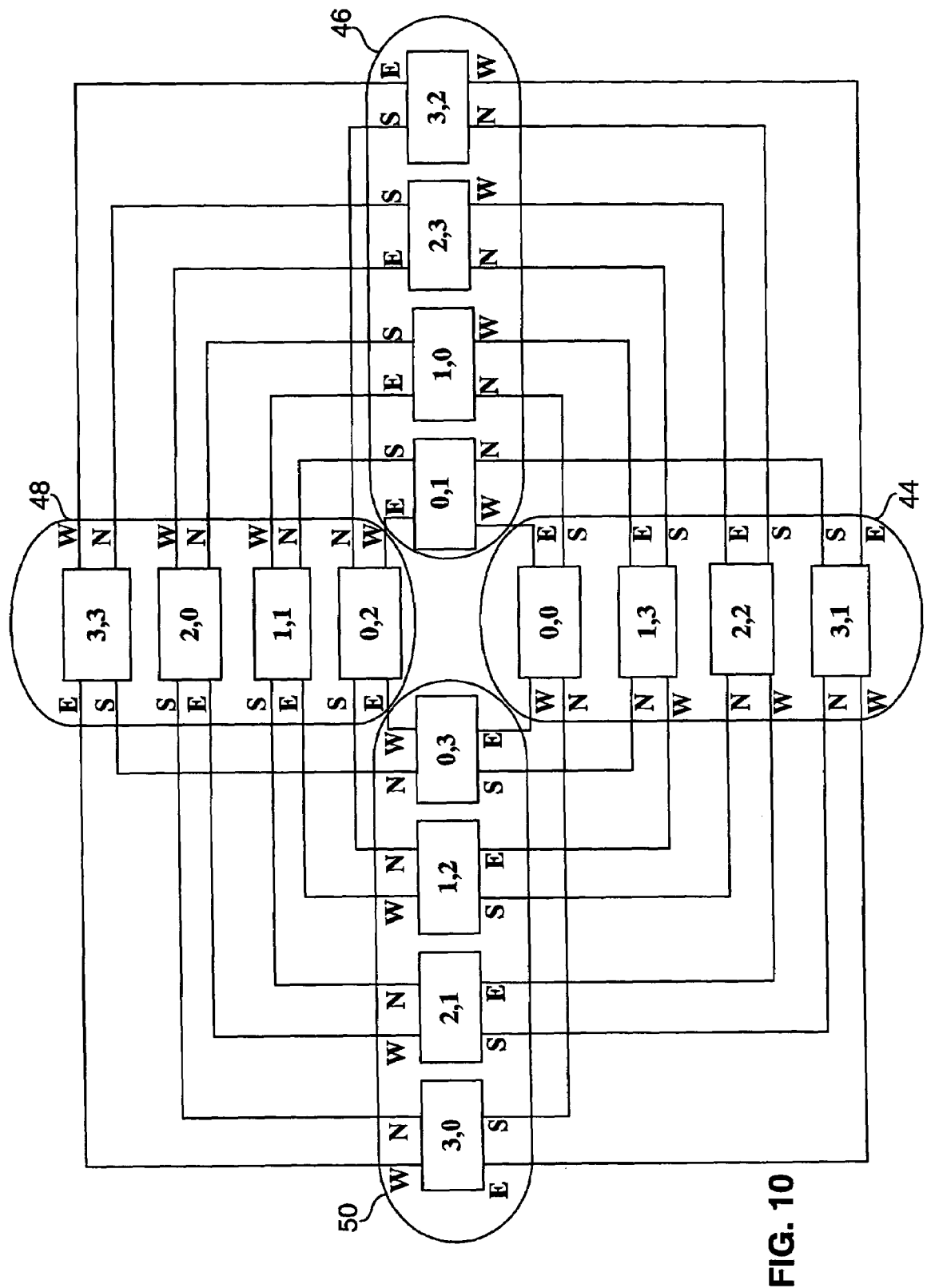
FIG. 10 is a block diagram which illustrates the inter-cluster communications paths of the new PE clusters.

Another, equivalent way of viewing the cluster-building process is illustrated in FIG. 9. In this and similar figures that follow, wraparound wires are omitted from the figure for the sake of clarity. A conventional 4×4 torus is first twisted into a rhombus, as illustrated by the leftward shift of each row. This shift serves to group transpose PEs in "vertical slices" of the rhombus. To produce equal-size clusters the rhombus is, basically, formed into a cylinder. That is, the left-most, or western-most, vertical slice 80 is wrapped around to abut the eastern-most $PE_{0,3}$ in its row. The vertical slice 82 to the east of slice 80 is wrapped around to abut $PE_{0,0}$ and $PE_{1,3}$, and the next eastward vertical slice 84 is wrapped around to abut $PE_{0,1}$, $PE_{1,0}$ and $PE_{2,3}$. Although, for the sake of clarity, all connections are not shown, all connections remain the same as in the original 4×4 torus. The resulting vertical slices produce the clusters of the preferred embodiment 44 through 50 shown in FIG. 5A, the same clusters produced in the manner illustrated in the discussion related to FIGS. 5A and 6. In FIG. 10, the clusters created in the rhombus/cylinder process of FIG. 9 are "peeled open" for illustrative purposes to reveal the inter-cluster connections. For example, all inter-PE connections from cluster 44 to cluster 46 are to the South and East, as are those from cluster 46 to cluster 48 and from cluster 48 to cluster 50 and from cluster 50 to cluster 44. This commonality of inter-cluster communications, in combination with the nature of inter-PE communications in a SIMD process permits a significant reduction in the number of inter-PE connections. As discussed in greater detail in relation to FIGS. 16 and 17 below, mutually exclusive communications, e.g., communications to the South and East from cluster 44 to cluster 46 may be multiplexed onto a common set of interconnection wires running between the clusters. Consequently, the inter-PE connection wiring of the new array, hereinafter referred to as the "manifold array", may be substantially reduced, to one half the number of interconnection wires associated with a conventional nearest neighbor torus array.

Figures 11A, 11B:
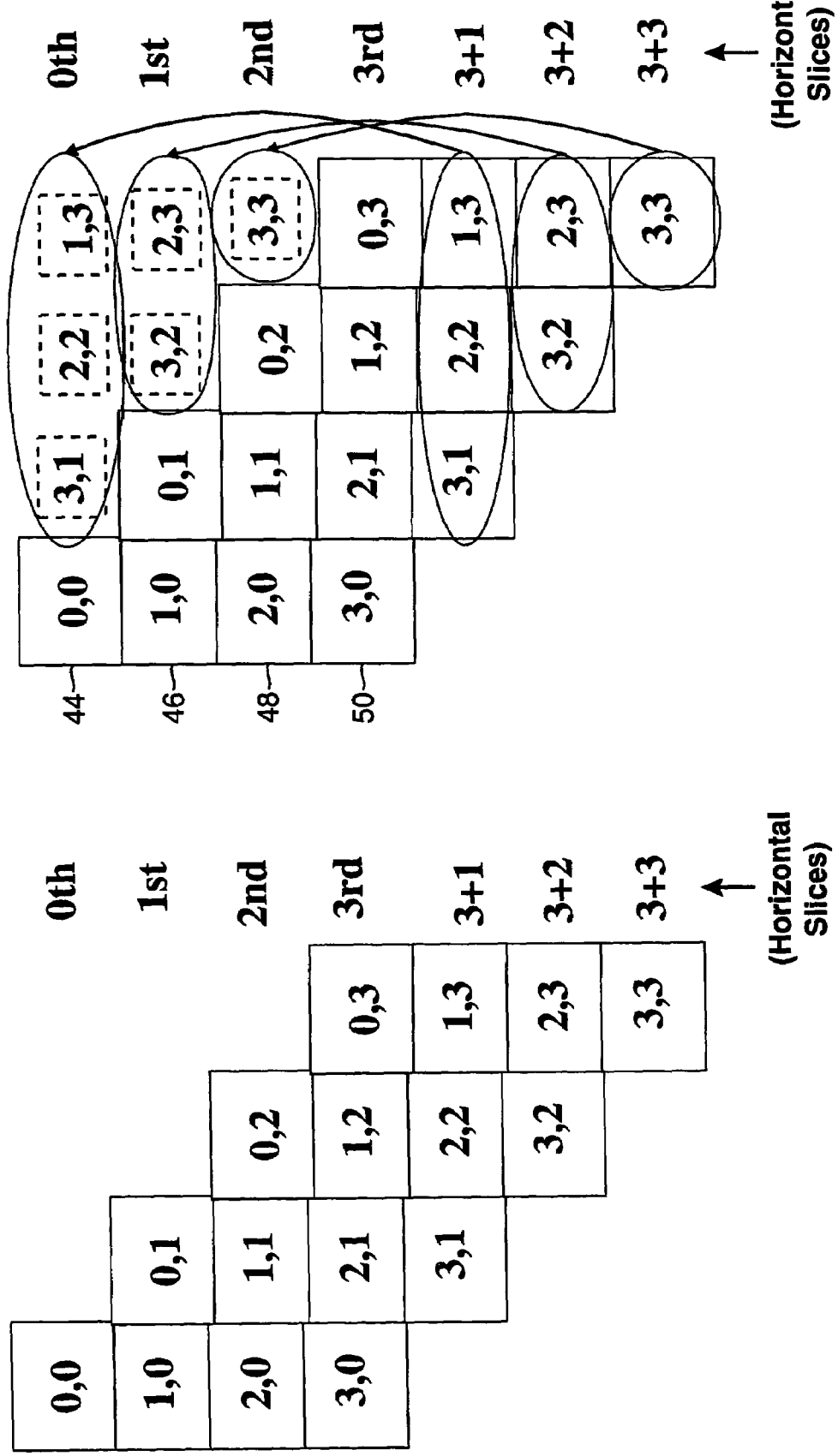
FIGS. 11A and 11B illustrate alternative rhombus/cylinder approaches to PE cluster selection.

The cluster formation process used to produce a manifold array is symmetrical and the clusters formed by taking horizontal slices of a vertically shifted torus are the same as clusters formed by taking vertical slices of a horizontally shifted torus. FIGS. 11A and 11B illustrate the fact that the rhombus/cylinder technique may also be employed to produce the preferred clusters from horizontal slices of a vertically shifted torus. In FIG. 11A the columns of a conventional 4×4 torus array are shifted vertically to produce a rhombus and in FIG. 11B the rhombus is wrapped into a cylinder. Horizontal slices of the resulting cylinder provide the preferred clusters 44 through 50. Any of the techniques illustrated to this point may be employed to create clusters for manifold arrays which provide inter-PE connectivity equivalent to that of a conventional torus array, with substantially reduced inter-PE wiring requirements.

Figure 12:
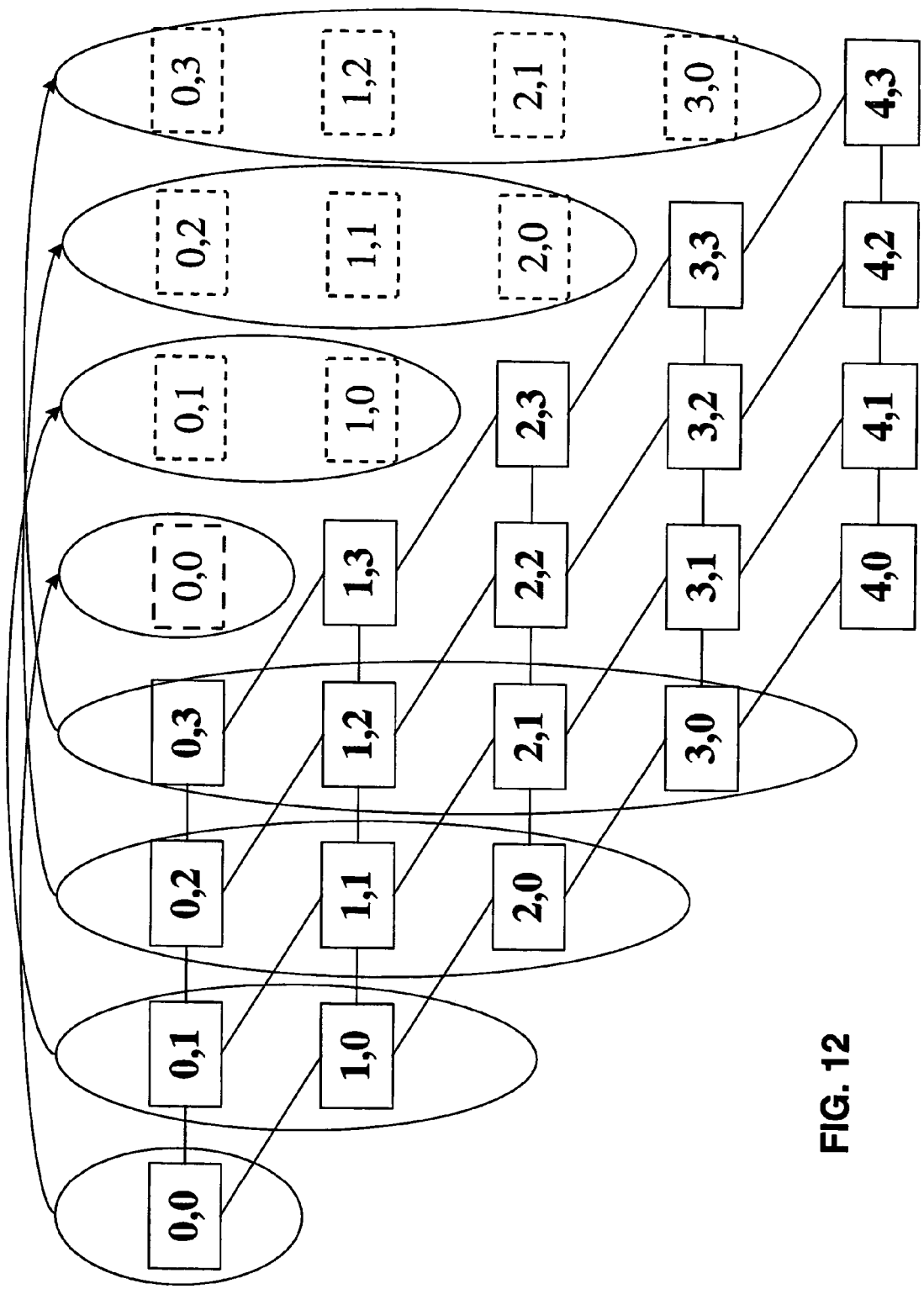
FIG. 12 is a block diagram illustration of the rhombus/cylinder PE selection process for a 5×4 PE array.
Figure 13:
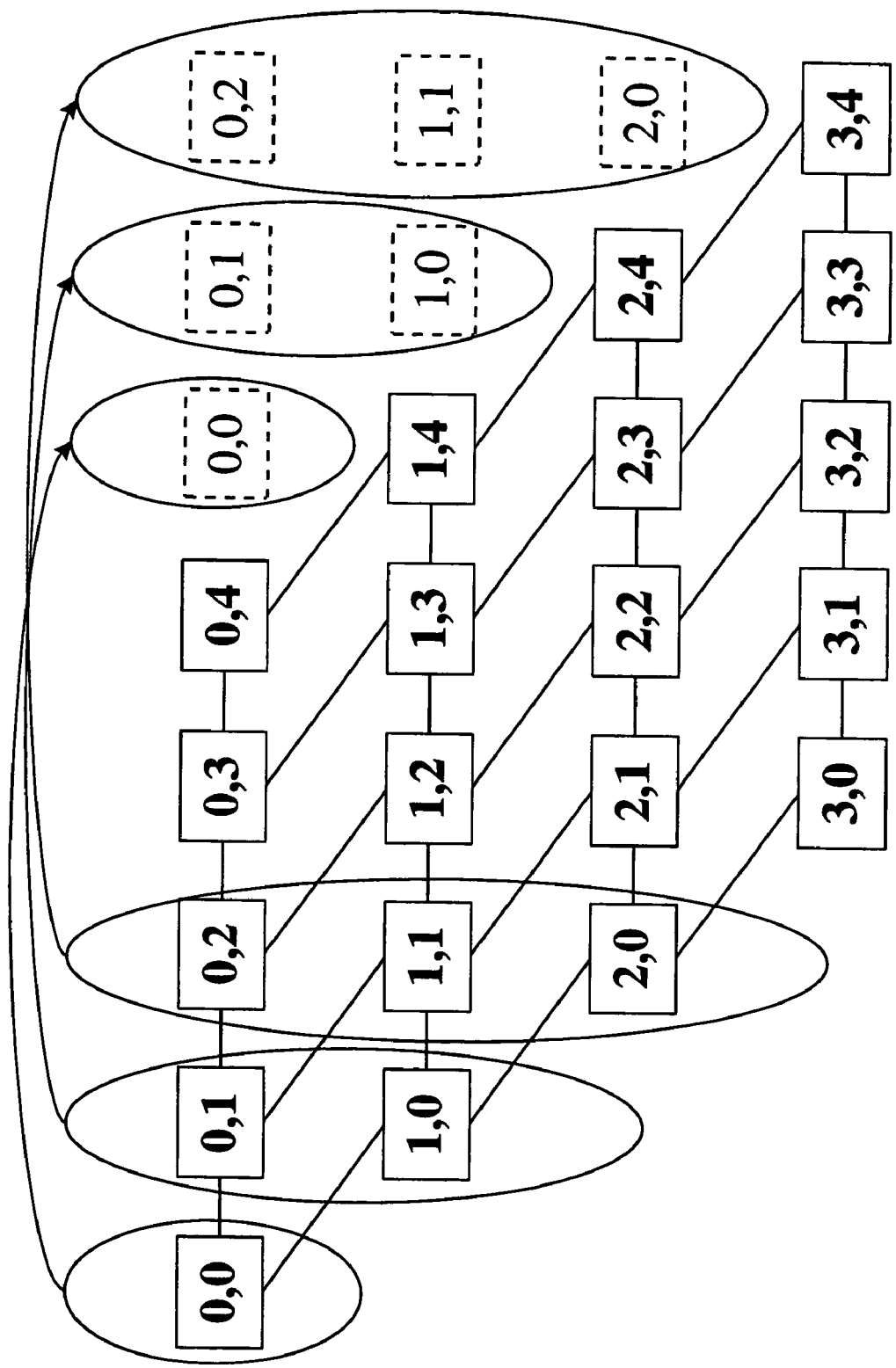
FIG. 13 is a block diagram illustration of the rhombus/cylinder PE selection process for a 4×5 PE array.
Figure 14:
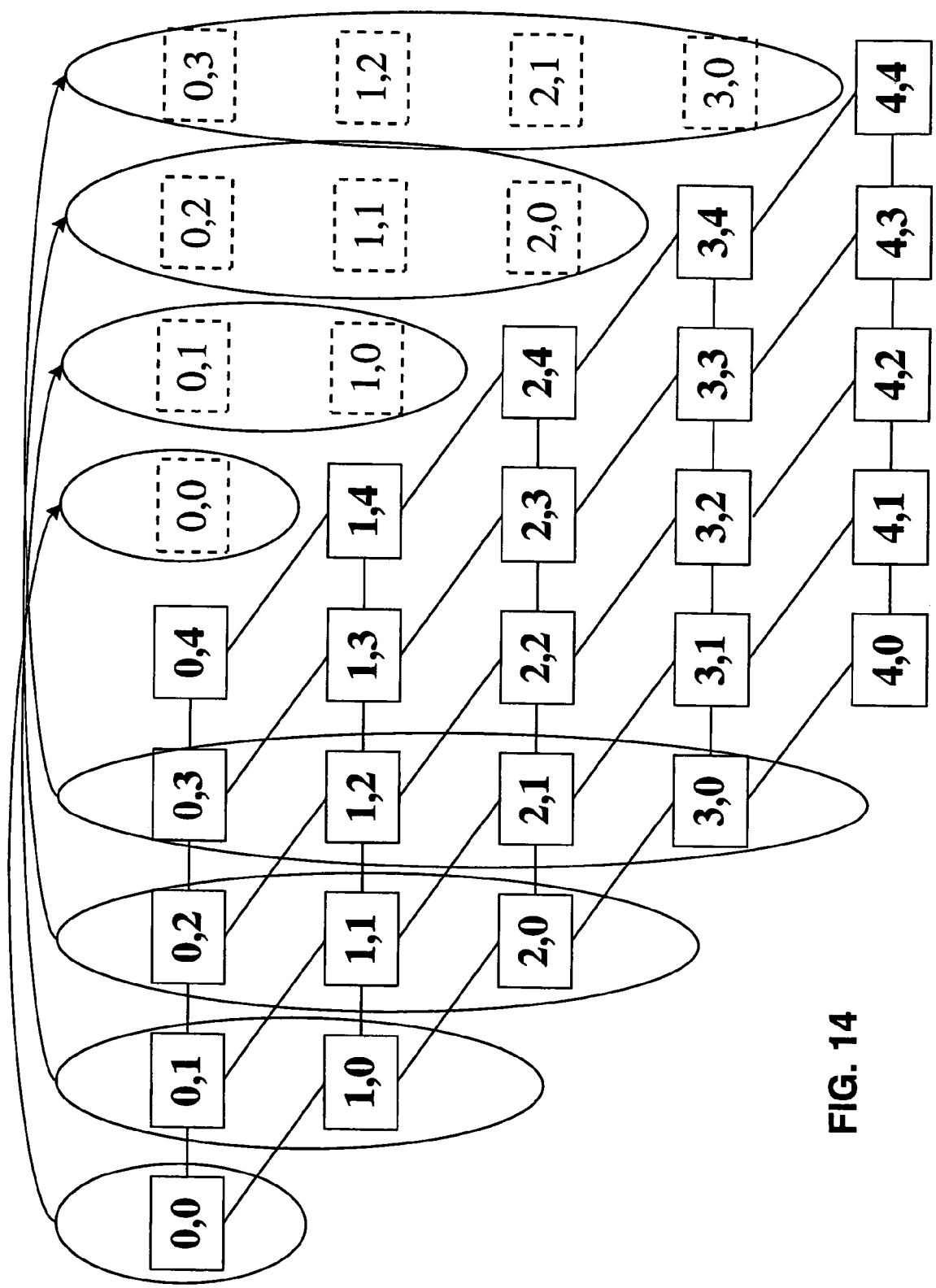
FIG. 14 is a block diagram illustration of the rhombus/cylinder PE selection process for a 5×5 PE array.

As noted in the summary, the above clustering process is general and may be employed to produce manifold arrays of M clusters containing N PEs each from an N×M torus array. For example, the rhombus/cylinder approach to creating four clusters of five PEs, for a 5×4 torus array equivalent is illustrated in FIG. 12. Note that the vertical slices which form the new PE clusters, for example, $PE_{4,0}$, $PE_{3,1}$, $PE_{2,2}$, $PE_{1,3}$, and $PE_{0,0}$ maintain the transpose clustering relationship of the previously illustrated 4×4 array. Similarly, as illustrated in the diagram of FIG. 13, a 4×5 torus will yield five clusters of four PEs each with the transpose relationship only slightly modified from that obtained with a 4×4 torus. In fact, transpose PEs are still clustered together, only in a slightly different arrangement than with the 4×4 clustered array. For example, transpose pairs $PE_{1,0}/PE_{0,1}$ and $PE_{2,3}/PE_{3,2}$ were grouped in the same cluster within the preferred 4×4 manifold array, but they appear, still paired, but in separate clusters in the 4×5 manifold array of FIG. 13. As illustrated in the cluster-selection diagram of FIG. 14, the diagonal PEs, $PE_{i,j}$ where i=j, in an odd number by odd number array are distributed one per, cluster.

The block diagrams of FIGS. 15A–15D illustrate the inter-cluster connections of the new manifold array. To simplify the description, in the following discussion, unidirectional connection paths are assumed unless otherwise stated. Although, for the sake of clarity, the invention is described with parallel interconnection paths, or buses, represented by individual lines. Bit-serial communications, in other words buses having a single line, are also contemplated by the invention. Where bus multiplexers or bus switches are used, the multiplexer and/or switches are replicated for the number of lines in the bus. Additionally, with appropriate network connections and microprocessor chip implementations of PEs, the new array may be employed with systems which allow dynamic switching between MIMD, SIMD and SISD modes, as described in U.S. Pat. No. 5,475,856 to P. M. Kogge, entitled, *Dynamic Multi-Mode Parallel Processor Array Architecture*, which is hereby incorporated by reference.

Figure 15B:
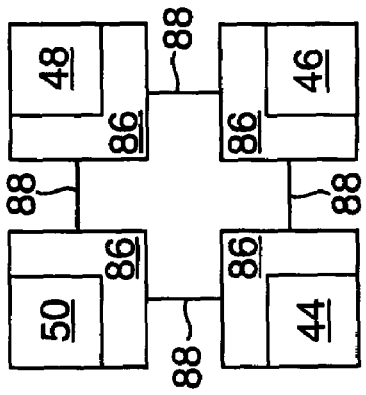
FIGS. 15A through 15D are block diagram illustrations of inter-cluster communications paths for 3, 4, 5, and 6 cluster by 6 PE arrays, respectively.
Figure 15D:
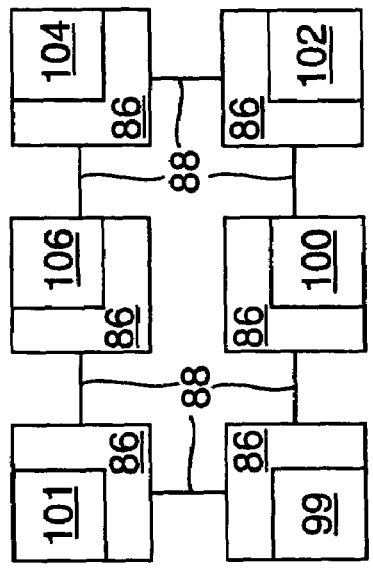
Figure 15A:
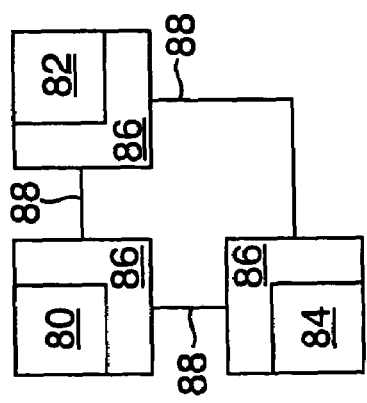
Figure 15C:
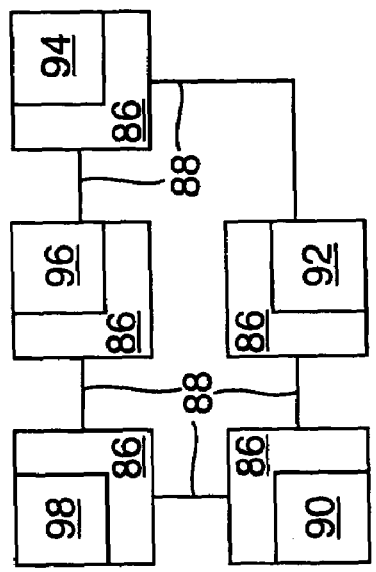

In FIG. 15A, clusters 80, 82 and 84 are three PE clusters connected through cluster switches 86 and inter-cluster links 88 to one another. To understand how the manifold array PEs connect to one another to create a particular topology, the connection view from a PE must be changed from that of a single PE to that of the PE as a member of a cluster of PEs. For a manifold array operating in a SIMD unidirectional communication environment, any PE requires only one transmit port and one receive port, independent of the number of connections between the PE and any of its directly attached neighborhood of PEs in the conventional torus. In general, for array communication patterns that cause no conflicts between communicating PEs, only one transmit and one receive port are required per PE, independent of the number of neighborhood connections a particular topology may require of its PEs.

Four clusters, 44 through 50, of four PEs each are combined in the array of FIG. 15B. Cluster switches 86 and communication paths 88 connect the clusters in a manner explained in greater detail in the discussion of FIGS. 16, 17, and 18 below. Similarly, five clusters, 90 through 98, of five PEs each are combined in the array of FIG. 15C. In practice, the clusters 90–98 are placed as appropriate to ease integrated circuit layout and to reduce the length of the longest inter-cluster connection. FIG. 15D illustrates a manifold array of six clusters, 99, 100, 101, 102, 104, and 106, having six PEs each. Since communication paths 86 in the new manifold array are between clusters, the wraparound connection problem of the conventional torus array is eliminated. That is, no matter how large the array becomes, no interconnection path need be longer than the basic inter-cluster spacing illustrated by the connection paths 88. This is in contrast to wraparound connections of conventional torus arrays which must span the entire array.

The block diagram of FIG. 16 illustrates in greater detail a preferred embodiment of a four cluster, sixteen PE, manifold array. The clusters 44 through 50 are arranged, much as they would be in an integrated circuit layout, in a rectangle or square. The connection paths 88 and cluster switches are illustrated in greater detail in this figure. Connections to the South and East are multiplexed through the cluster switches 86 in order to reduce the number of connection lines between PEs. For example, the South connection between $PE_{1,2}$ and $PE_{2,2}$ is carried over a connection path 110, as is the East connection from $PE_{2,1}$ to $PE_{2,2}$. As noted above, each connection path, such as the connection path 110 may be a bit-serial path and, consequently, may be effected in an integrated circuit implementation by a single metallization line. Additionally, the connection paths are only enabled when the respective control line is asserted. These control lines can be generated by the instruction decoder/controller 38 of each $PE_{3,0}$, illustrated in FIG. 3A. Alternatively, these control lines can be generated by an independent instruction decoder/controller that is included in each cluster switch. Since there are multiple PEs per switch, the multiple enable signals generated by each PE are compared to make sure they have the same value in order to ensure that no error has occurred and that all PEs are operating synchronously. That is, there is a control line associated with each noted direction path, N for North, S for South, E for East, and W for West. The signals on these lines enable the multiplexer to pass data on the associated data path through the multiplexer to the connected PE. When the control signals are not asserted the associated data paths are not enabled and data is not transferred along those paths through the multiplexer.

The block diagram of FIG. 17 illustrates in greater detail the interconnection paths 88 and switch clusters 86 which link the four clusters 44 through 50. In this figure, the West and North connections are added to the East and South connections illustrated in FIG. 16. Although, in this view, each processing element appears to have two input and two output ports, in the preferred embodiment another layer of multiplexing within the cluster switches brings the number of communications ports for each PE down to one for input and one for output. In a standard torus with four neighborhood transmit connections per PE and with unidirectional communications, that is, only one transmit direction enabled per PE, there are four multiplexer or gated circuit transmit paths required in each PE. A gated circuit may suitably include multiplexers, AND gates, tristate driver/receivers with enable and disable control signals, and other such interface enabling/disabling circuitry. This is due to the interconnection topology defined as part of the PE. The net result is that there are $4N^2$ multiple transmit paths in the standard torus. In the manifold array, with equivalent connectivity and unlimited communications, only $2N^2$ multiplexed or gated circuit transmit paths are required. This reduction of $2N^2$ transmit paths translates into a significant savings in integrated circuit real estate area, as the area consumed by the multiplexers and $2N^2$ transmit paths is significantly less than that consumed by $4N^2$ transmit paths.

Figure 18:
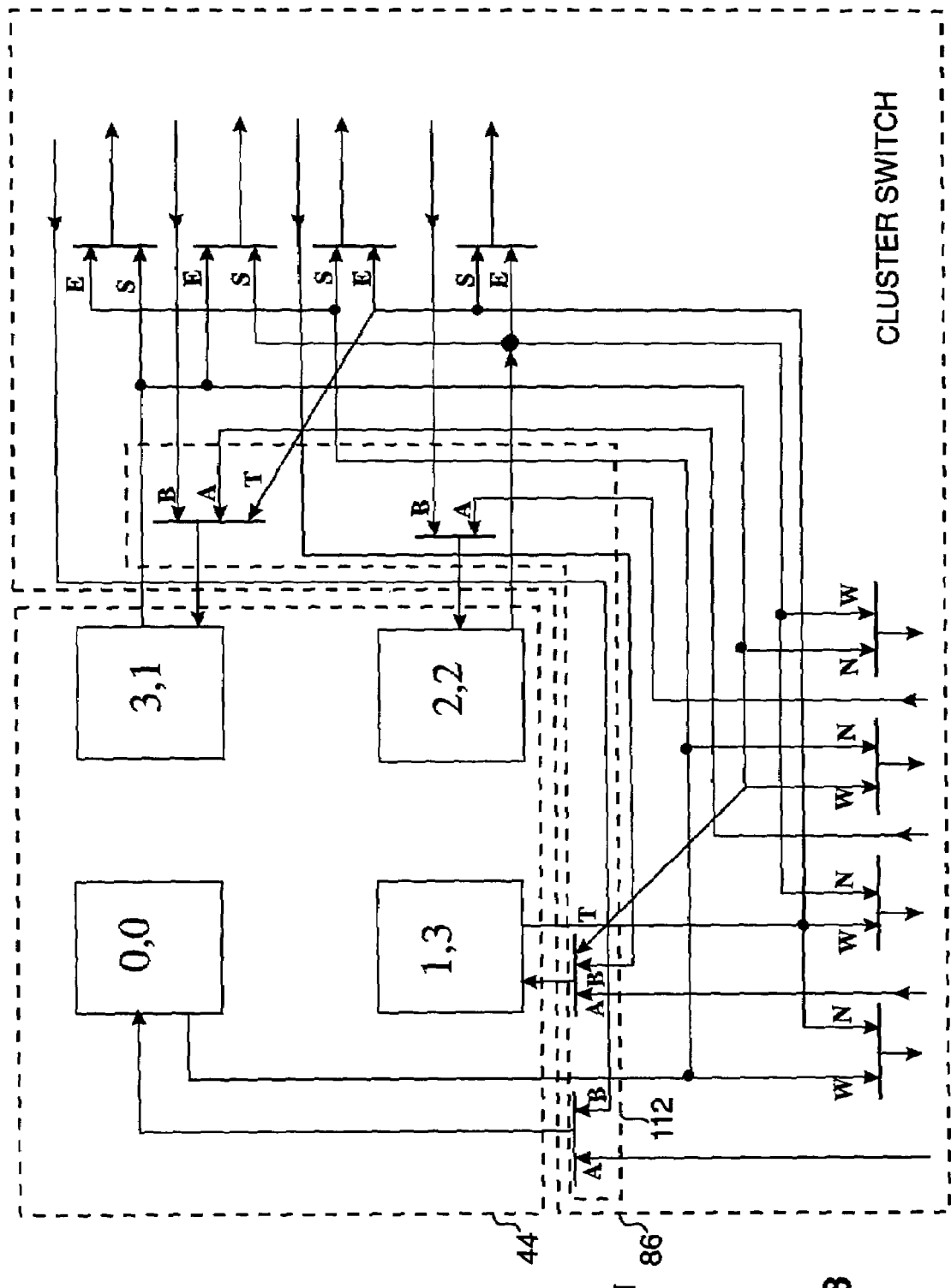
FIG. 18 is a block diagram illustrating one of the clusters of the embodiment of FIG. 17, which illustrates in greater detail a cluster switch and its interface to the illustrated cluster.

A complete cluster switch 86 is illustrated in greater detail in the block diagram of FIG. 18. The North, South, East, and West outputs are as previously illustrated. Another layer of multiplexing 112 has been added to the cluster switch 86. This layer of multiplexing selects between East/South reception, labeled A, and North/West reception, labeled B, thereby reducing the communications port requirements of each PE to one receive port and one send port. Additionally, multiplexed connections between transpose PEs, $PE_{1,3}$ and $PE_{3,1}$, are effected through the intra-cluster transpose connections labeled T. When the T multiplexer enable signal for a particular multiplexer is asserted, communications from a transpose PE are received at the PE associated with the multiplexer. In the preferred embodiment, all clusters include transpose paths such as this between a PE and its transpose PE. These figures illustrate the overall connection scheme and are not intended to illustrate how a multi-layer integrated circuit implementation may accomplish the entirety of the routine array interconnections that would typically be made as a routine matter of design choice. As with any integrated circuit layout, the IC designer would analyze various tradeoffs in the process of laying out an actual IC implementation of an array in accordance with the present invention. For example, the cluster switch may be distributed within the PE cluster to reduce the wiring lengths of the numerous interfaces.

Figures 19A, 19B:
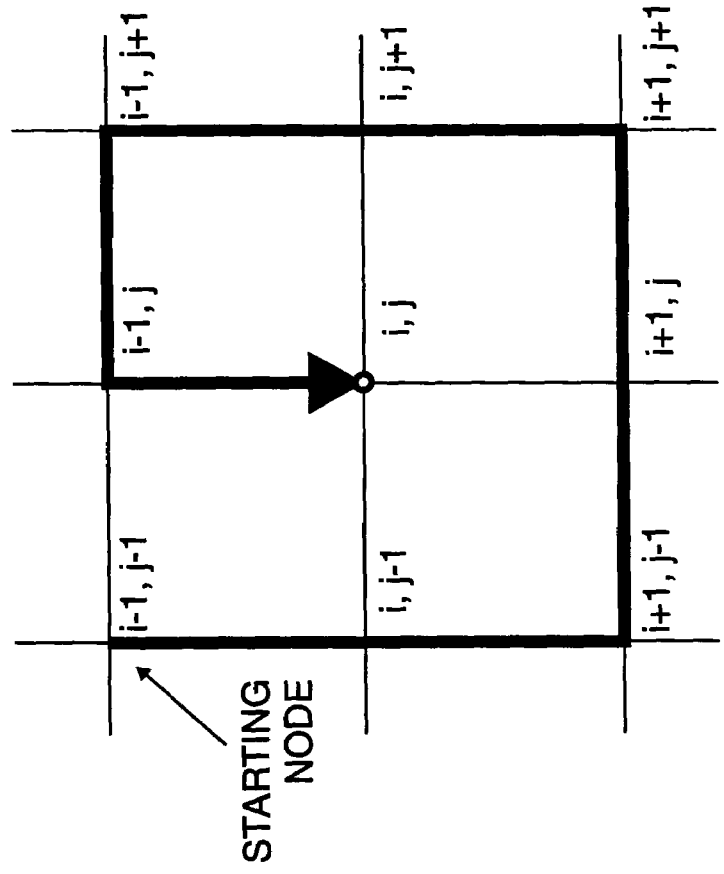
FIGS. 19A and 19B illustrate a convolution window and convolution path, respectively, employed in an exemplary convolution which may advantageously be carried out on the new array processor of the present invention.

To demonstrate the equivalence to a torus array's communication capabilities and the ability to execute an image processing algorithm on the Manifold Array, a simple 2D convolution using a 3×3 window, FIG. 19A, will be described below. The Lee and Aggarwal algorithm for convolution on a torus machine will be used. See, S. Y. Lee and J. K. Aggarwal, *Parallel 2D Convolution on a Mesh Connected Array Processor*, IEEE Transactions on Patter Analysis and Machine Intelligence, Vol. PAMI-9, No. 4, pp. 590–594, July 1987. The internal structure of a basic PE 30, FIG. 3A, is used to demonstrate the convolution as executed on a 4×4 Manifold Array with 16 of these PEs. For purposes of this example, the Instruction Decoder/Controller also provides the Cluster Switch multiplexer Enable signals. Since there are multiple PEs per switch, the multiple enable signals are compared to be equal to ensure no error has occurred and all PEs are operating in synchronism. Based upon the S. Y. Lee and J. K. Aggarwal algorithm for convolution, the Manifold array would desirably be the size of the image, for example, an N×N array for a N×N image. Due to implementation issues it must be assumed that the array is smaller than N×N for large N. Assuming the array size is C×C, the image processing can be partitioned into multiple C×C blocks, taking into account the image block overlap required by the convolution window size. Various techniques can be used to handle the edge effects of the N×N image. For example, pixel replication can be used that effectively generates an (N+1)×(N+1) array. It is noted that due to the simplicity of the processing required, a very small PE could be defined in an application specific implementation. Consequently, a large number of PEs could be placed in a Manifold Array organization on a chip thereby improving the efficiency of the convolution calculations for large image sizes.

The convolution algorithm provides a simple means to demonstrate the functional equivalence of the Manifold Array organization to a torus array for North/East/South/West nearest neighbor communication operations. Consequently, the example focuses on the communications aspects of the algorithm and, for simplicity of discussion, a very small 4×4 image size is used on a 4×4 Manifold array. Larger N×N images can be handled in this approach by loading a new 4×4 image segment into the array after each previous 4×4 block is finished. For the 4×4 array no wrap around is used and for the edge PEs 0's are received from the virtual PEs not present in the physical implementation. The processing for one 4×4 block of pixels will be covered in this operating example.

Figures 19C, 19D:
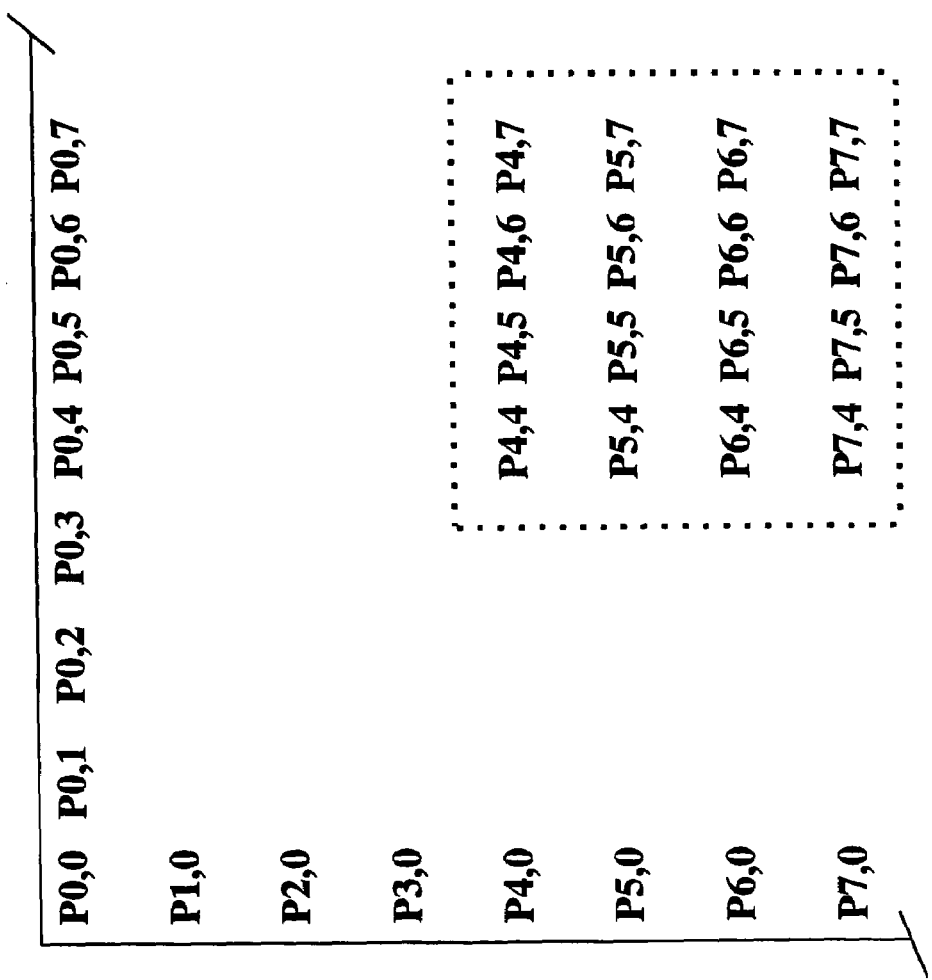
FIGS. 19C and 19D are block diagrams which respectively illustrate a portion of an image within a 4×4 block and the block loaded into conventional torus locations.

To begin the convolution example, it is assumed that the PEs have already been initialized by a SIMD controller, such as controller 29 of FIG. 3A, and the initial 4×4 block of pixels has been loaded through the data bus to register R1 in each PE, in other words, one pixel per PE has been loaded. FIG. 19C shows a portion of an image with a 4×4 block to be loaded into the array. FIG. 19D shows this block loaded in the 4×4 torus logical positions. In addition, it is assumed that the accumulating sum register R0 in each PE has been initialized to zero. Though inconsequential to this algorithm, R2 has also been shown as initialized to zero. The convolution window elements are broadcast one at a time in each step of the algorithm. These window elements are received into register R2. The initial state of the machine prior to broadcasting the window elements is shown in FIG. 20A. The steps to calculate the sum of the weighted pixel values in a 3×3 neighborhood for all PEs follows.

The algorithm begins with the transmission (broadcasting) of the first window element W00 to all PEs. Once this is received in each PE, the PEs calculate the first R0=R0+R2*R1 or R0=R0+W*P. The result of the calculation is then communicated to a nearest neighbor PE according to the convolution path chosen, FIG. 19B. For simplicity of discussion it is assumed that each operational step to be described can be partitioned into three substeps each controlled by instructions dispatched from the controller: a broadcast window element step, a computation step, and a communications step. It is noted that improvements to this simplified approach can be developed, such as, beginning with major step 2, overlapping the window element broadcast step with the communications of result step. These points are not essential to the purpose of this description and would be recognized by one of ordinary skill in the art. A superscript is used to represent the summation step value as the operation proceeds. As an aid for following the communications of the calculated values, a subscript on a label indicates the source PE that the value was generated in. The convolution path for pixel $\{i,j\}$ is shown in FIG. 19B. FIGS. 20–24 indicate the state of the Manifold Array after each computation step.

In FIG. 20B, W00 is broadcast to the PEs and each PE calculates $R0^1 = 0 + W00*R1$ and communicates $R0^1$ to the South PE where the received $R0^1$ value is stored in the PEs' register R0.

In FIG. 21A, W10 is broadcast to the PEs and each PE calculates $R0^2 = R0^1 + W10*R1$ and communicates $R0^2$ to the South PE where the received $R0^2$ value is stored in the PEs' register R0.

In FIG. 21B, W20 is broadcast to the PEs and each PE calculates $R0^3 = R0^2 + W20*R1$ and communicates $R0^3$ to the North PE where the received $R0^3$ value is stored in the PEs' register R0.

Figure 22B:
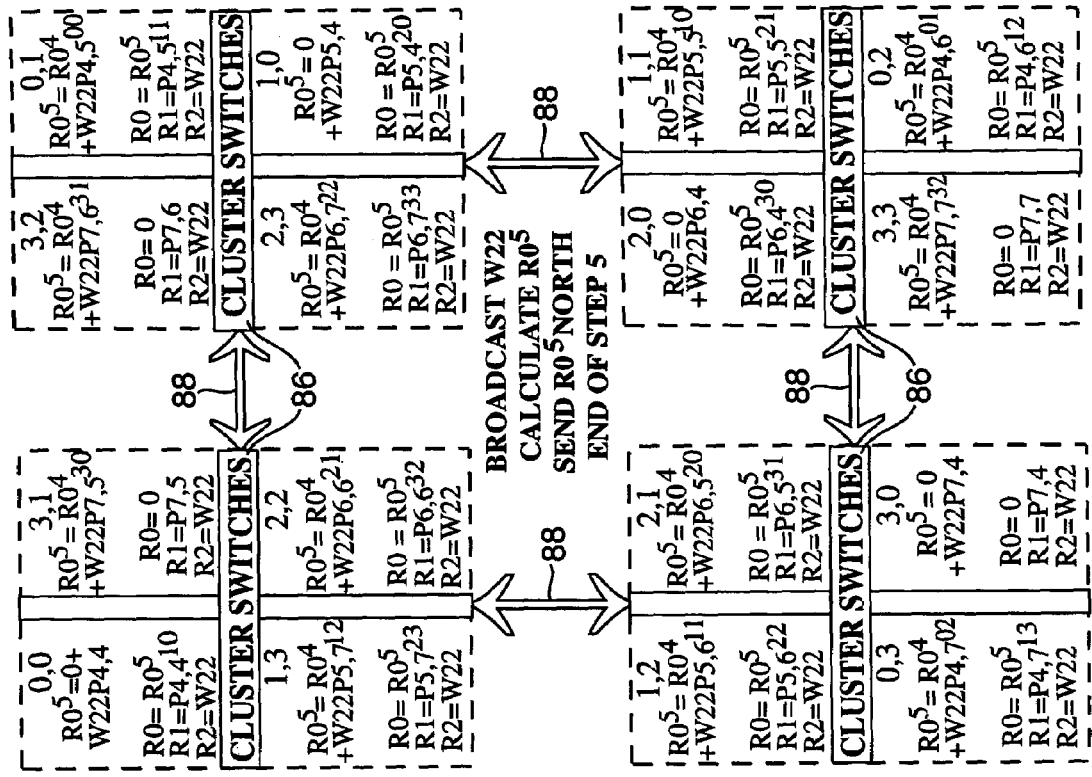
Figure 22A:
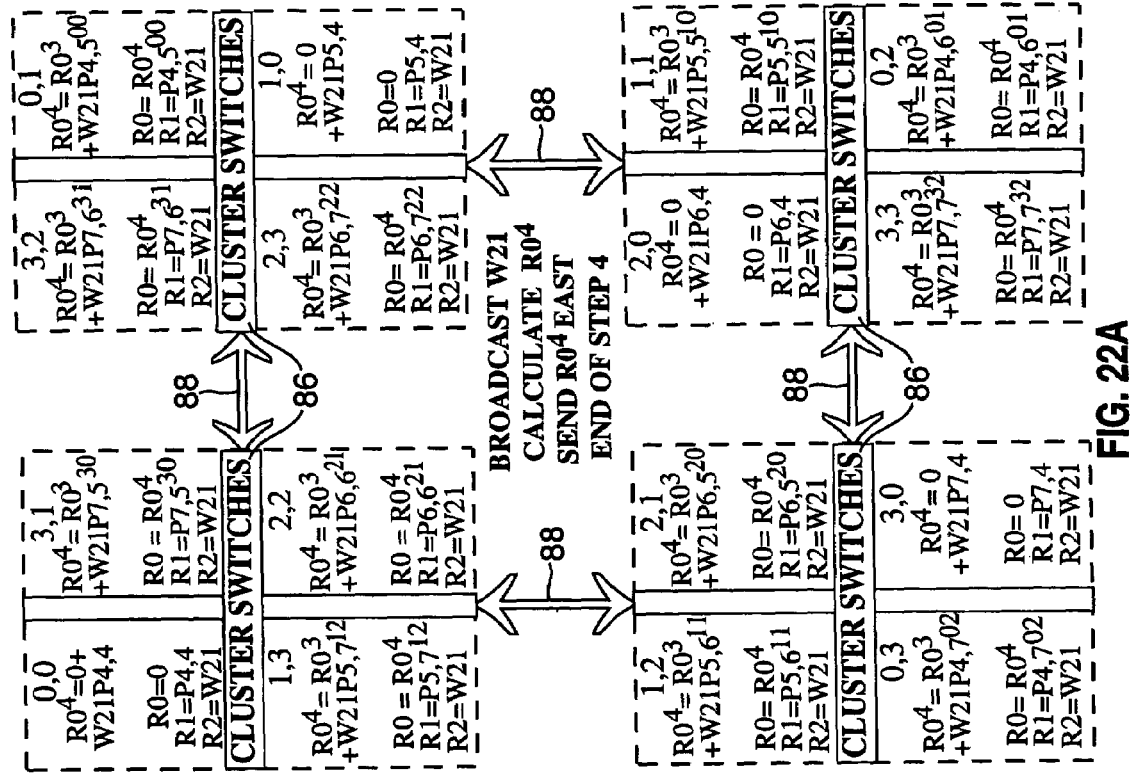

In FIG. 22A, W21 is broadcast to the PEs and each PE calculates $R0^4 = R0^3 + W21*R1$ and communicates $R0^4$ to the East PE where the received $R0^4$ value is stored in the PEs' register R0.

In FIG. 22B, W22 is broadcast to the PEs and each PE calculates $R0^5 = R0^4 + W22*R1$ and communicates $R0^5$ to the North PE where the received $R0^5$ value is stored in the PEs' register R0.

Figures 23A, 23B:
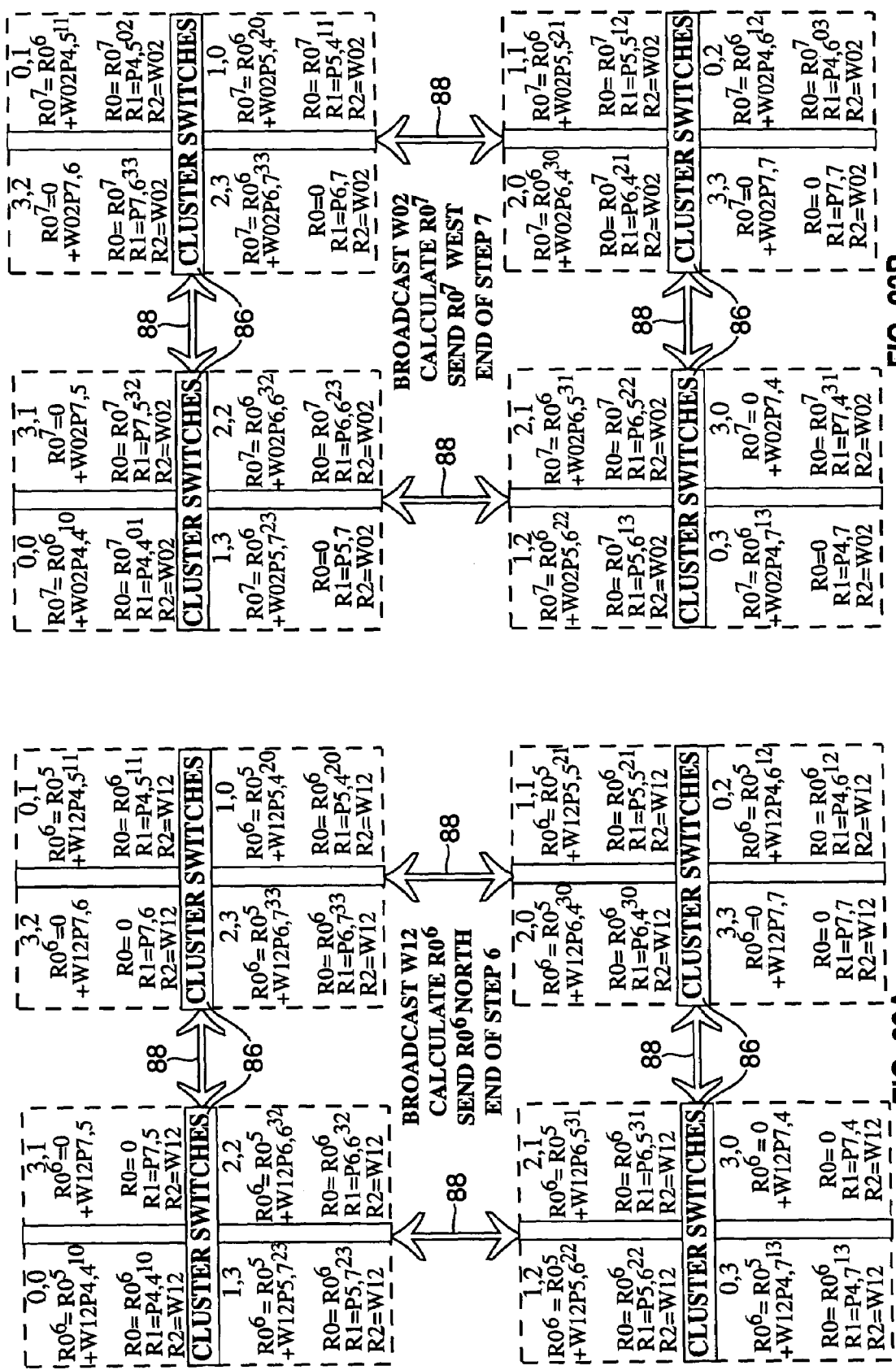

In FIG. 23A, W12 is broadcast to the PEs and each PE calculates $R0^6 = R0^5 + W12*R1$ and communicates $R0^6$ to the North PE where the received $R0^6$ value is stored in the PEs' register R0

In FIG. 23B, W02 is broadcast to the PEs and each PE calculates $R0^7 = R0^6 + W02*R1$ and communicates $R0^7$ to the West PE where the received R07 value is stored in the PEs' register R0

Figures 24A, 24B:
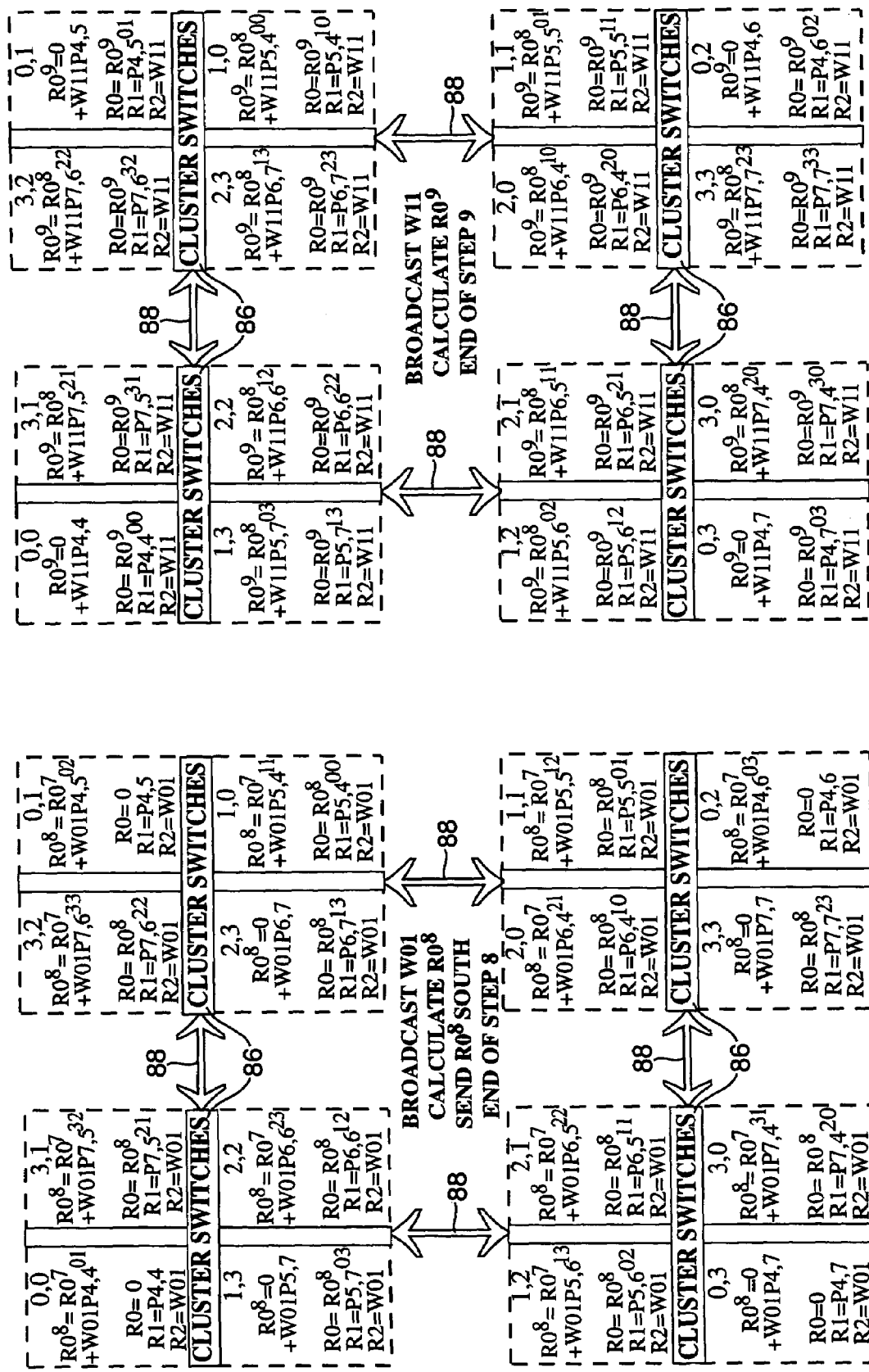

In FIG. 24A, W01 is broadcast to the PEs and each PE calculates $R0^8 = R0^7 + W01*R1$ and communicates $R0^8$ to the South PE where the received $R0^8$ value is stored in the PEs' register R0

In FIG. 24B, W11 is broadcast to the PEs and each PE calculates $R0^9 = R0^8 + W11*R1$ and End.

At the end of the above nine steps each $PE_{i,j}$ contains (with reference to FIG. 19B): $C_{i,j} = W00P_{i-1,j-1} + W10P_{i,j-1} + W20P_{i+1,j-1} + W21P_{i+1,j} + W22P_{i+1,j+1} + W12P_{i,j+1} + W02P_{i-1,j+1} + W01P_{i-1,j} + W11P_{i,j}$.

For example, for i=5, and j=6 $C_{5,6} = W00P4,5 + W10P5,5 + W20P6,5 + W21P6,6 + W22P6,7 + W12P5,7 + W02P4,7 + W01P4,6 + W11P5,6$.

It is noted that at the completion of this example, given the operating assumptions, four valid convolution values have been calculated, namely the ones in PEs $\{(1,1), (1,2), (2,1), (2,2)\}$. This is due to the edge effects as discussed previously. Due to the simple nature of the PE needed for this algorithm, a large number of PEs can be incorporated on a chip, thereby greatly increasing the efficiency of the convolution calculation for large image sizes.

The above example demonstrates that the Manifold Array is equivalent in its communications capabilities for the four—North, East, South, and West—communications directions of a standard torus while requiring only half the wiring expense of the standard torus. Given the Manifold Array's capability to communicate between transpose PEs, implemented with a regular connection pattern, minimum wire length, and minimum cost, the Manifold Array provides additional capabilities beyond the standard torus. Since the Manifold Array organization is more regular as it is made up of the same size clusters of PEs while still providing the communications capabilities of transpose and neighborhood communications, it represents a superior design to the standard and diagonal fold toruses of the prior art.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described in order to best explain the principles of the invention and its practical application, to thereby enable others skilled in the art to best utilize the invention. It is intended that the scope of the invention be limited only by the claims appended hereto.

We claim:

1. An array processor comprising:
   processing elements grouped into a plurality of clusters, wherein each processing element is identified as a node in a torus network;
   a first cluster having a first plurality of processing elements, the number of processing elements in the first cluster being less than the number of nodes in the torus network;
   a first cluster switch to which each processing element of the first plurality of processing elements is connected; and
   a cluster control line connected to the first cluster switch for carrying a control signal, the control signal controlling the operation of the first cluster switch to selectively establish a connection path between two processing elements of the first plurality of processing elements, wherein the two processing elements are transpose nodes of the torus network and wherein each connection path established through the first cluster switch is communicatively equivalent to a connection path between two nearest neighbor processing elements disposed in the torus network.

2. The array processor of claim 1 further comprising:
   a second cluster having a second plurality of processing elements; and
   a second cluster switch connected to the first cluster switch, each processing element of the second cluster connected to the second cluster switch, the first and second cluster switches being further operable to establish a connection path between one processing element of the first plurality of processing elements with a processing element of the second plurality of processing elements.

3. The array processor of claim 1 wherein each processing element is uniquely identified with an identifier which represents a matrix coordinate for a matrix element of a matrix, the matrix having a number of matrix elements greater than the number of processing elements in the first cluster.

4. The array processor of claim 3 wherein each processing element of the first plurality of processing elements is uniquely identified with a matrix coordinate which is the transpose of another processing element in the first plurality of processing elements or a matrix coordinate having equal indices.

5. The array processor of claim 1 wherein the first cluster switch further comprises a first plurality of multiplexers to establish an intra-cluster connection path between two processing elements in the first plurality of processing elements.

6. The array processor of claim 5 wherein the first and second cluster switches each further comprises a second plurality of multiplexers for establishing an inter-cluster connection path between a processing element in the first plurality of processing elements and a processing element within an adjacent cluster.

7. An array processor comprising:
  a plurality of clusters, each cluster having a plurality of processing elements, each processing element having an identifier which represents a matrix coordinate for a matrix element of a matrix wherein the identifier is used to indicate if a processing element is adjacent or not adjacent to another processing element, the matrix having a number of matrix elements greater than the number of processing elements of any cluster;
  a plurality of cluster switches, each cluster switch connecting two adjacent clusters, each cluster switch connected to each processing element in its associated cluster, each cluster switch operable to establish a first connection path between a processing element and its corresponding transpose processing element located in the same cluster or a second connection path between adjacent processing elements located in adjacent clusters; and
  a plurality of control lines controlling the plurality of cluster switches to select a connection path to establish between processing elements.

8. The array processor of claim 7 wherein the plurality of control lines carry signals to establish connection paths between nearest neighbor processing elements, each established connection path has an input direction and an output direction, the input direction is relative to the matrix coordinate uniquely identifying the processing element receiving from the input direction, the output direction is relative to the matrix coordinate of the processing element transmitting to the output direction.

9. The array processor of claim 8 wherein the input direction is North, South, East, or West.

10. The array processor of claim 9 wherein the output direction is North, South, East, or West and different from the established input direction.

11. The array processor of claim 7 wherein each processing element of each cluster has a matrix coordinate uniquely identifying each processing element which is the transpose of another processing element in the same cluster or a matrix coordinate having equal indices.

12. The array processor of claim 11 wherein each processing element's nearest matrix element neighbor is located in an adjacent cluster.

13. A method of arranging processing elements within a plurality of clusters to perform matrix operations in parallel, the method comprising:
  identifying processing elements to represent a matrix coordinate for a matrix element of a torus matrix, the torus matrix having a number of matrix elements greater than the number of processing elements in any one cluster;
  grouping processing elements into each cluster such that each cluster contains non-adjacent processing elements and their transpose processing elements and a cluster switch, wherein each cluster switch is connected to an adjacent cluster through its cluster switch; selecting at least two of the processing elements; and
  establishing a communication path between the at least two of the processing elements.

14. The method of claim 13 wherein the establishing step further comprises establishing a communication path between two processing elements disposed within the same cluster.

15. The method of claim 13 wherein the establishing step further comprises establishing a communication path between two processing elements disposed in adjacent clusters.

* * * * *